US009983849B2

(12) United States Patent
Weingartner

(10) Patent No.: US 9,983,849 B2
(45) Date of Patent: *May 29, 2018

(54) VOICE COMMAND-DRIVEN DATABASE

(71) Applicant: Intelligently Interactive, Inc., New York, NY (US)

(72) Inventor: Eric H. Weingartner, New York, NY (US)

(73) Assignee: INTELLIGENTLY INTERACTIVE, INC., New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/441,742

(22) Filed: Feb. 24, 2017

(65) Prior Publication Data
US 2018/0011685 A1    Jan. 11, 2018

Related U.S. Application Data

(63) Continuation of application No. 15/204,981, filed on Jul. 7, 2016, now Pat. No. 9,619,202.

(51) Int. Cl.
*G10L 15/22* (2006.01)
*G10L 15/30* (2013.01)
(Continued)

(52) U.S. Cl.
CPC ............ *G06F 3/167* (2013.01); *G06F 3/0414* (2013.01); *G06F 3/0416* (2013.01);
(Continued)

(58) Field of Classification Search
CPC ......... G10L 15/22; G10L 15/30; G10L 15/26; G10L 13/00; G10L 13/02; G10L 13/04
See application file for complete search history.

(56) References Cited

U.S. PATENT DOCUMENTS 5,924,068 A * 7/1999 Richard ................. H04N 7/088
345/901
7,711,569 B2 * 5/2010 Takeuchi .......... G06F 17/30654
704/1

(Continued)

FOREIGN PATENT DOCUMENTS

WO       2015073869 A1     5/2015

OTHER PUBLICATIONS

Miller, "Ekko Player for iPhone Will Read the Latest News Headlines & Stories to You", https://web.archive.org/web/20150501175754/http://9to5mac.com/2015/04/30/ekko-player-ios/, Apr. 30, 2015.*

(Continued)

*Primary Examiner* — Samuel G Neway
(74) *Attorney, Agent, or Firm* — Weitzman Law Offices, LLC

(57) ABSTRACT

A voice command-driven system and computer-implemented method are disclosed for selecting a data item in a list of text-based data items stored in a database using a simple affirmative voice command input without utilizing a connection to a network. The text-based data items in the list are converted to speech using an embedded text-to-speech engine and an audio output of a first converted data item is provided. A listening state is entered into for a predefined pause time to await receipt of the simple affirmative voice command input. If the simple affirmative voice command input is received during the predefined pause time, the first converted data item is selected for processing. If the simple affirmative voice command input is not received during the predefined pause time, an audio output of a next converted data item in the list is provided.

14 Claims, 12 Drawing Sheets

(51) Int. Cl.
  *G10L 13/02* (2013.01)
  *G06F 3/16* (2006.01)
  *G10L 13/08* (2013.01)
  *G10L 15/26* (2006.01)
  *G06F 3/0488* (2013.01)
  *G06F 3/0482* (2013.01)
  *G06F 3/041* (2006.01)

(52) U.S. Cl.
  CPC .......... *G06F 3/0482* (2013.01); *G06F 3/0488* (2013.01); *G10L 13/08* (2013.01); *G10L 15/22* (2013.01); *G10L 15/265* (2013.01); *G10L 13/02* (2013.01); *G10L 15/30* (2013.01); *G10L 2015/223* (2013.01)

(56) References Cited

U.S. PATENT DOCUMENTS

| | | | |
|---|---|---|---|
| 7,818,659 B2 | 10/2010 | Kahn et al. | |
| 7,865,511 B2 | 1/2011 | Kahn et al. | |
| 7,921,187 B2 | 4/2011 | Lunati et al. | |
| 8,060,830 B2 | 11/2011 | Kahn et al. | |
| 8,171,128 B2 | 5/2012 | Zuckerberg et al. | |
| 8,315,878 B1 | 11/2012 | Burns et al. | |
| 8,412,532 B2 | 4/2013 | Gruenstein et al. | |
| 8,438,485 B2 * | 5/2013 | Kulis | G06F 3/167 704/270.1 |
| 8,676,904 B2 | 3/2014 | Lindahl | |
| 8,843,376 B2 | 9/2014 | Cross, Jr. | |
| 9,099,092 B2 | 8/2015 | Zhang et al. | |
| 9,111,534 B1 * | 8/2015 | Sylvester | G06Q 30/0251 |
| 9,262,612 B2 | 2/2016 | Cheyer | |
| 9,300,784 B2 | 3/2016 | Roberts et al. | |
| 9,338,493 B2 | 5/2016 | Van Os et al. | |
| 2004/0186713 A1 | 9/2004 | Gomas et al. | |
| 2007/0078857 A1 | 4/2007 | Punaganti et al. | |
| 2007/0198273 A1 | 8/2007 | Hennecke | |
| 2008/0071544 A1 * | 3/2008 | Beaufays | G06F 17/30867 704/270.1 |
| 2009/0271200 A1 | 10/2009 | Mishra et al. | |
| 2010/0169097 A1 | 7/2010 | Nachman et al. | |
| 2010/0312547 A1 * | 12/2010 | Van Os | G06F 3/167 704/9 |
| 2012/0179457 A1 | 7/2012 | Newman et al. | |
| 2013/0073294 A1 | 3/2013 | Burns et al. | |
| 2013/0275138 A1 | 10/2013 | Gruber et al. | |
| 2014/0006032 A1 | 1/2014 | Korn | |
| 2014/0122059 A1 | 5/2014 | Patel et al. | |
| 2015/0194167 A1 | 7/2015 | Jeong | |
| 2015/0215455 A1 | 7/2015 | Perotti et al. | |
| 2015/0248887 A1 | 9/2015 | Wlodkowski et al. | |
| 2015/0254058 A1 | 9/2015 | Klein et al. | |
| 2015/0339049 A1 | 11/2015 | Kasemset et al. | |
| 2016/0071509 A1 * | 3/2016 | Zhao | G10L 13/04 704/260 |
| 2016/0125881 A1 | 5/2016 | Vogel et al. | |

OTHER PUBLICATIONS

Miller, "Ekko Player for iPhone will Read the Latest News Headlines & Stories to You," https://web.archive.org/web/2015051175754/http://9to5mac.com/2015/04/30/ekko-player-ios/ (Apr. 30, 2015)

* cited by examiner

VOICE COMMAND-DRIVEN DATABASE

CROSS-REFERENCE TO RELATED APPLICATION

This application is a continuation of co-pending U.S. patent application Ser. No. 15/204,981, filed Jul. 7, 2016, the entirety of which is incorporated herein by reference.

BACKGROUND

This disclosure relates generally to computerized databases, and more specifically, to a voice command-driven system for selecting and controlling content in a dynamic list stored in a database.

Modern computing devices are able to access a vast quantity of information, both via the Internet and from other sources. Functionality for such devices is increasing rapidly, as mobile computing devices are able to run software applications to perform various tasks and provide different types of information. However, users who wish to operate a computing device while concurrently performing other activities (e.g., operating a vehicle, riding a bicycle, exercising, etc.), are visually impaired or disabled in some manner, or simply wish to rest their eyes while interacting with the device, may have difficulty interfacing effectively with their devices due to limited or no ability to read a display screen or physically interact with the device (e.g., using a keyboard, mouse, touch screen, etc.).

Many modern computing devices include functionality that enables a user to interact with the device using natural language, rather than employing a conventional manual user interface (e.g., menus or programmed commands). Most of the popular natural language voice recognition systems for mobile computing devices and consumer products today, such as Apple Inc.'s Siri® and Amazon.com, Inc.'s Amazon Echo®, rely on passing phonemes of speech over the Internet to a cloud-based automated speech recognition (ASR) system to decipher the phonemes as words (commonly known as "speech-to-text" (STT)). Powerful servers use natural language recognition (NLR) to then decipher meaning from the spoken utterances. However, these ASR and NLR systems do not function without a live Internet connection to pass the STT input from the user's device to the ASR/NLR server(s) and then back to the user's device for the intended results/actions.

Some mobile computing devices utilize command-driven ASR systems that allow for the spoken interaction to control the system on the mobile device without requiring a connection to the Internet. Command-driven ASR systems typically rely on a limited vocabulary list of words at any given time during the course of interaction by the user and may be part of an embedded system within a mobile device that does not require a remote server to translate the STT to control the system. In such embedded systems, the user is predominantly accessing a limited type of data (e.g., phone numbers, music, etc.) that is generally known to the user at the time of a voice command input. Systems that rely on commands, however, shift the burden to the user to remember different commands or keywords in a dynamic implementation of the vocabulary list, thus increasing the difficulty for the user to know, remember or guess the commands to enable useful control and interaction. For this reason, conventional embedded, command-driven ASR systems are suitable for limited applications in mobile devices (e.g., retrieving phone numbers or email addresses, selecting music, or requesting directions to a specific address) where the vocabulary list is limited, finite, and generally known by the user.

Conventional command-driven, embedded ASR systems are not suitable for more complex applications requiring a large vocabulary due to the limited computational, memory and battery resources of mobile computing devices. As the vocabulary required for responses increases or varies, the accuracy of the speech recognition decreases in embedded ASR systems. Therefore, it is desirable to reduce the number of commands to increase the accuracy of the embedded ASR system.

In addition, there are many applications that require large vocabularies, oftentimes without the ASR system or the user knowing in advance what vocabulary is required. For instance, in the context of news feeds, such as Atom and Really Simple Syndication (RSS) feeds, a list of current headlines for news content is dynamic, including vocabulary that is essentially limitless and not readily known to the system or user in advance. Because certain words are harder for an embedded ASR to recognize, interpretation of STT would typically be offloaded over the Internet to an external server having greater processing power.

Another area that adds complexity is the interaction with an ASR system using the microphone and speaker of a mobile device. Because the microphone is typically close to the speaker on most mobile devices, the ASR system can erroneously act upon its own TTS output or ambient sounds when "listening" for a voice command from the user. Additionally, it can be a challenge for the user to know when to speak while interacting with a TTS list and relying on a an erratic pause delay in the TTS between varied-length content, such as, for example, a list of news headlines. The user doesn't know when the TTS of the individual content has concluded without a delay in their response time. The pause length between the TTS of content can be set to address the time needed for the user, but still requires a lot of attention for the user to respond quickly enough to speak to initiate a selection or increase the overall time it takes for the user to navigate through the list of content.

Accordingly, there is a need for a voice command-driven, embedded ASR system that is not dependent on having an Internet connection, and allows a user to use and control the TTS playback, including pause length, for a dynamic list with a limited number of simple voice commands to navigate dynamic, unknown content stored in a database.

SUMMARY

According to one aspect of this disclosure, a mobile device news reader and a voice-command-driven method for controlling a news reader device are disclosed. The device includes at least one processor, at least one database coupled to the at least one processor, a text-to-speech engine embedded in the mobile device and executable by the at least one processor to convert text data stored in the at least one database to a speech-based output, a speech-to-text engine embedded in the mobile device and executable by the at least one processor to process a voice command input received from a user of the device and generate data in the form of text that corresponds to the received voice command input. Non-transient memory coupled to the at least one processor stores program instructions, which, when executed by the at least one processor, cause the at least one processor to receive text-based news articles and text-based headlines associated with the news articles over a network from a remote server, and store a list of the received news articles correlated with a list of the received headlines in the at least one database. Without utilizing a connection to the network, the list of headlines are retrieved from the at least one database, and text of one headline in the retrieved list of headlines is incrementally converted from text-to-speech using the embedded text-to-speech engine and a speech-based output of the converted one headline is provided to a user of the news reader. Following output of the converted one headline, the at least one processor enters into a listen mode for a predetermined pause time during which the at least one processor will await receipt of a simple affirmative voice command input from the user. If the simple affirmative voice command input is not received from the user during the pause time, text of a next headline in the retrieved list of headlines is converted from text-to-speech, a speech-based output of the converted next headline is provided to the user, and the at least one processor re-enters the listen mode for the predetermined pause time during which the at least one processor will again await receipt of the simple affirmative voice command input from the user. The at least one processor repeats the actions in the preceding sentence until either the simple affirmative voice command input is received during one of the pause times or all headlines in the list have been output to the user.

According to another aspect of this disclosure, if the simple affirmative voice command input was received from the user during the pause time, the text-based news article that corresponds to the converted headline output preceding receipt of the simple affirmative voice command input is retrieved from the list of news articles stored in the at least one database. The retrieved news article is converted from text-to-speech using the embedded text-to-speech engine and a speech-based output of at least a portion of the converted news article is provided to the user.

According to another aspect of this disclosure, user-adjustable settings may be selected by a user of the device using the simple affirmative voice command without utilizing a connection to the network. A text-based list of user-adjustable settings are retrieved from the at least one database, and the at least one processor incrementally converts text of a first setting in the retrieved list of user-adjustable settings from text-to-speech using the embedded text-to-speech engine and provides a speech-based output of the converted first setting to the user. Following output of the converted first setting, the at least one processor re-enters the listen mode for the predetermined pause time during which the at least one processor will await receipt of the simple affirmative voice command input from the user. If the simple affirmative voice command input is not received from the user during the pause time, text of a next setting in the retrieved list of user-adjustable settings is converted from text-to-speech using the embedded text-to-speech engine, a speech-based output of the converted next setting is provided to the user, and the at least one processor re-enters the listen mode for the predetermined pause time during which the at least one processor will again await receipt of the simple affirmative voice command input from the user. The at least one processor repeats the actions in the preceding sentence until either the simple affirmative voice command input is received during the pause time immediately following the speech-based output of one of the converted settings of the retrieved list of user-adjustable settings, or all settings in the list have been output to the user.

According to another aspect of this disclosure, a plurality of audibly distinct tones may be generated and output to the user as an indication that the device has entered the listen mode for the predetermined pause time or for an indefinite pause time until another voice command input is received from the user, and/or the pause time has expired.

According to another aspect of this disclosure, a visual display of voice commands available to the user is provided on a display screen coupled to the at least one processor. In some embodiments, the visual display identifies active voice commands available to the user at a current operating state of the device.

According to another aspect of this disclosure, a voice command-driven system and computer-implemented method are disclosed for selecting a data item in a list of text-based data items stored in a database using a simple affirmative voice command input without utilizing a connection to the network. The text-based data items in the list are converted to speech using an embedded text-to-speech engine and an audio output of a first converted data item is provided. A listening state is entered into for a predefined pause time to await receipt of the simple affirmative voice command input. If the simple affirmative voice command input is received during the predefined pause time, the first converted data item is selected for processing. If the simple affirmative voice command input is not received during the predefined pause time, an audio output of a next converted data item in the list is provided.

According to another aspect of this disclosure, a voice command-driven computing device and computer-implemented method are provided for navigating and controlling a dynamic database list. The voice-command driven computing device includes at least one processor, at least one database coupled to the at least one processor; a text-to-speech engine embedded in the computing device and executable by the at least one processor to convert text data stored in the at least one database to a speech-based output, and a speech-to-text engine embedded in the computing device and executable by the at least one processor to process a voice command input received from a user of the device and generate data in the form of text that corresponds to the received voice command input. Non-transient memory coupled to the at least one processor stores program instructions, which, when executed by the at least one processor, cause the at least one processor to store a dynamic content list of text-based data items correlated with a list of text-based descriptors, where each descriptor in the descriptor list corresponds to one of the data items in the content list. Without utilizing a connection to the network, the list of descriptors is retrieved from the at least one database and the at least one processor incrementally converts text of a first descriptor in the retrieved list of descriptors from text-to-speech using the embedded text-to-speech engine and provides a speech-based output of the converted first descriptor to a user of the computing device. Following output of the converted first descriptor, the at least one processor enters into a listen mode for a predetermined pause time during which the at least one processor will await receipt of a simple affirmative voice command input from the user. If the simple affirmative voice command input is not received from the user during the pause time, text of a next descriptor in the retrieved list of descriptors is converted from text-to-speech using the embedded text-to-speech engine, a speech-based output of the converted next descriptor is provided to the user, and the at least one processor re-enters the listen mode for the predetermined pause time during which the at least one processor will again await receipt of the simple affirmative voice command input from the user. The actions in the preceding sentence are repeated until either the simple affirmative voice command input is received during one of the pause times or all descriptors in the list have been output to the user.

DETAILED DESCRIPTION

Figure 1:
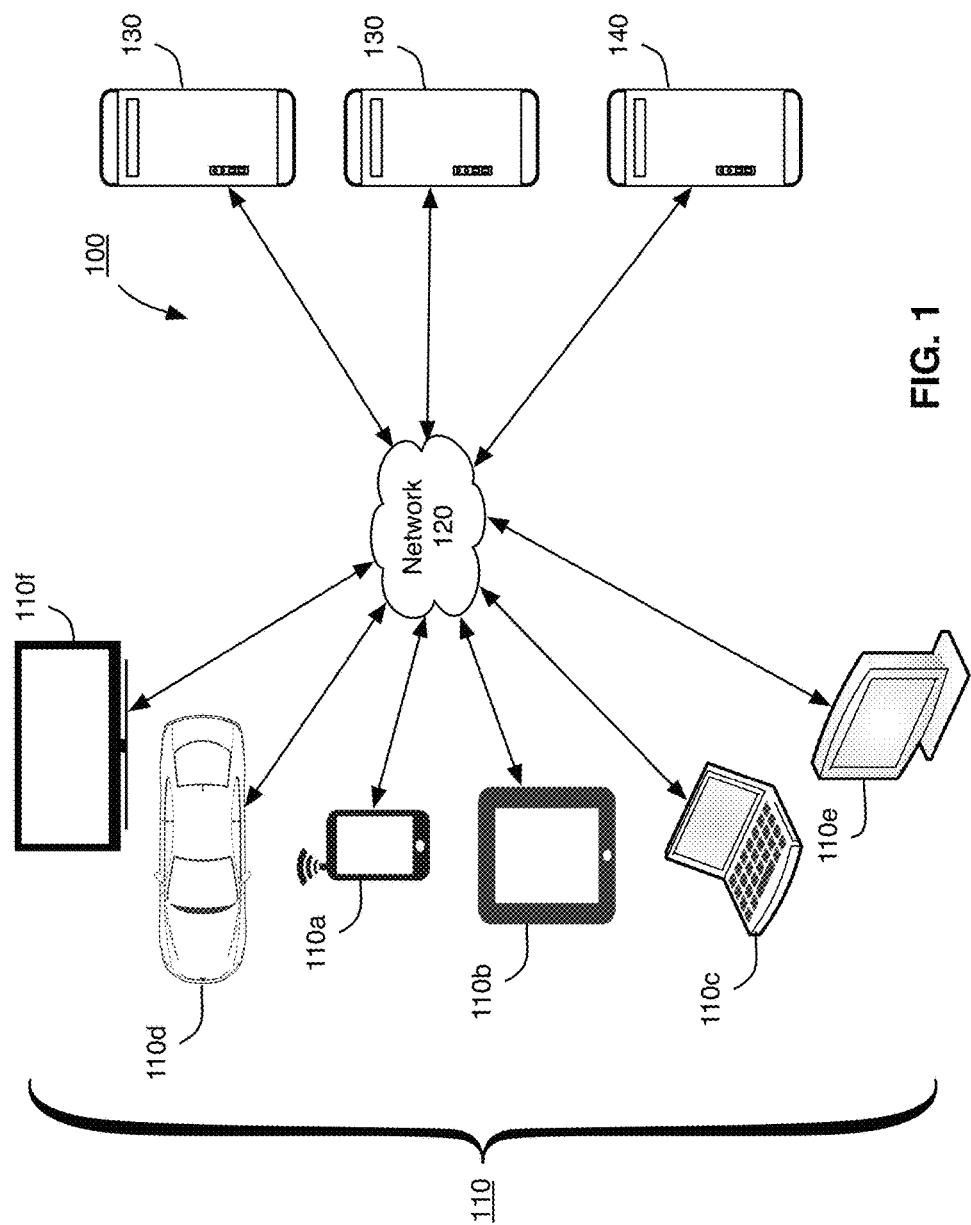
FIG. 1 is an illustrative network environment in which a voice command-driven database may be implemented.

The following detailed description refers to the accompanying drawings. The same labels and/or reference numbers in different drawings may identify the same or similar elements. The invention can be embodied in many different forms and should not be construed as limited to the embodiments set forth herein. Rather, the embodiments are provided so that this disclosure will be complete and will fully convey the invention to those skilled in the art.

This disclosure provides a technical solution to address the shortcomings of existing voice command-driven ASR systems, since the embodiments described herein are not dependent on having an Internet connection, and allow a user to use and control a dynamic list of unknown information stored in a database with a limited number of voice commands.

For illustrative purposes, embodiments of the invention are described in connection with a mechanism for interacting with information stored in a database or other data storage, such as (but not limited to) email, text messages, news feeds, music and other media content, search results, smart homes, and artificial intelligence (AI). It is understood, however, the invention is not intended to be limited to the specific, illustrative embodiments described herein and is applicable to applications requiring interaction with a database containing varied length and dynamic content that is not known to the user.

Embodiments of this disclosure are particularly well-suited for allowing a user of a computing device to use a small number of simple voice commands to navigate and control a list stored in a database or other data storage, especially where the list is dynamic and, therefore, not readily known to the user of the device.

Various specific details are set forth herein and in the drawings, to aid in understanding the invention. However, such specific details are intended to be illustrative, and are not intended to restrict in any way the scope of the invention as claimed herein. In addition, the particular screen layouts, appearance, and terminology as depicted and described herein are intended to be illustrative and exemplary and in no way limit the scope of the invention as claimed.

FIG. 1 illustrates a representative network environment 100 in which embodiments may be implemented. As shown in FIG. 1, a user employing a computing device 110 communicates over network 120. Network 120 may be a wide area network (WAN) such as the Internet, the Public Switched Telephone Network (PSTN), a local area network (LAN), an intranet, an extranet, a cellular network, any wired or wireless network, or any combination of the above.

The computing device(s) 110 are preferably mobile computing devices, such as (but not limited to) a smart phone 110a, tablet computer 110b, laptop computer 110c, in-vehicle computing devices 110d, or similar portable computing device. It is understood, however, that the invention disclosed herein is not limited to mobile computing devices and is applicable to other computing devices where it is desirable to interact with and control a list of content or data using voice commands. For example, a visually impaired person utilizing a desktop computer 110e may want to hear a list of content or data and select desired content from the list using a voice command. Similarly, a person using an interactive television (iTV) or a cable television set-top box 110f may want to select a desired television program or movie from a list (e.g., listing of available programming on an interactive program guide) using a simple voice command.

For illustration purposes only, six representative computing devices 110 are shown in FIG. 1—a smart phone 110a, such as (but not limited to) an iPhone® or Android® handheld device; a tablet 110b, such as (but not limited to) an iPad® or Windows® Surface® tablet computer or a tablet computer running Android® operating system; a laptop computer 110c; a desktop computer 110e, an iTV 110f; and an in-vehicle computing device 110d, such as (but not limited to) dedicated computing devices within a vehicle. Although six representative computing devices 110a-110f are shown in FIG. 1, it is understood that environment 100 may include any number of computing devices, each controlled by a respective user. For purposes of this disclosure, the term "computing device 110" will refer collectively to each of the devices 110a-110f, as well as to any other computing device that permits a user to control a dynamic list of content or data using simple voice commands.

The computing devices 110 communicate with one or more third-party servers 130 over network 120. Data or other content may be downloaded or streamed from one or more respective servers 130 for storage in memory on computing device 110. Third-party servers 130 may include (but are not limited to) servers hosting a website, email servers, news publisher servers for providing news feeds (e.g., Atom or RSS (Really Simple Syndication) feeds), or any other server from which desired content may be downloaded by or streamed to computing device 110 over network 120. The computing device 110 communicates with the third-party servers 130 to download content or commands, but does not require communication with the third-party servers over network 120 for ASR processing. Although only two third-party servers 130 are shown in FIG. 1, it is understood that environment 100 may include any number of third-party servers 130.

An optional intermediary system server 140 is also illustrated in FIG. 1 that, among other things, processes the desired content or data before it is downloaded by or streamed to computing device 110 from third-party servers 130 over network 120. This ensures that only the desired content or data is downloaded by or streamed to computing device 110. In some embodiments, the intermediary system server 140 strips out unwanted information that may be included with the desired content or data to be downloaded by or streamed to the computing device 110. For example, if desired content from a webpage hosted on third-party server 130 is to be downloaded by computing device 110, that webpage may include additional content (e.g., advertisements, images, navigation links, other unimportant content, etc.). Intermediary system server 140 may use conventional extractor software or programming to strip out this additional or unnecessary content so only the desired content (e.g., actual article/page text with no additional or unnecessary content) is downloaded for storage in the computing device 110.

In addition, in some embodiments, the intermediary server 140 may serve as a source of content to be downloaded by or streamed to computing device 110 over network 120, as opposed to or in addition to obtaining content or data from third-party servers 130. The intermediary server 140 may also be the source of available voice commands for client application software running on computing device 110. It is understood that intermediary server 140 may be separate from or combined with third-party server 130, and that one or more intermediary servers 140 may optionally be utilized with the various embodiments of this disclosure. Again, it is understood that ASR processing is performed locally on computing device 110 without the need to communicate over network 120 with third-party servers 130 or intermediary servers 140 for ASR processing. Nothing in this disclosure, however, should be construed to preclude the computing device 110 from being connected to network 120 for other purposes (e.g., connected to a cellular network for making calls, another application software running on computing device 110 communicating over a network for purposes other than described herein, etc.).

Figure 2:
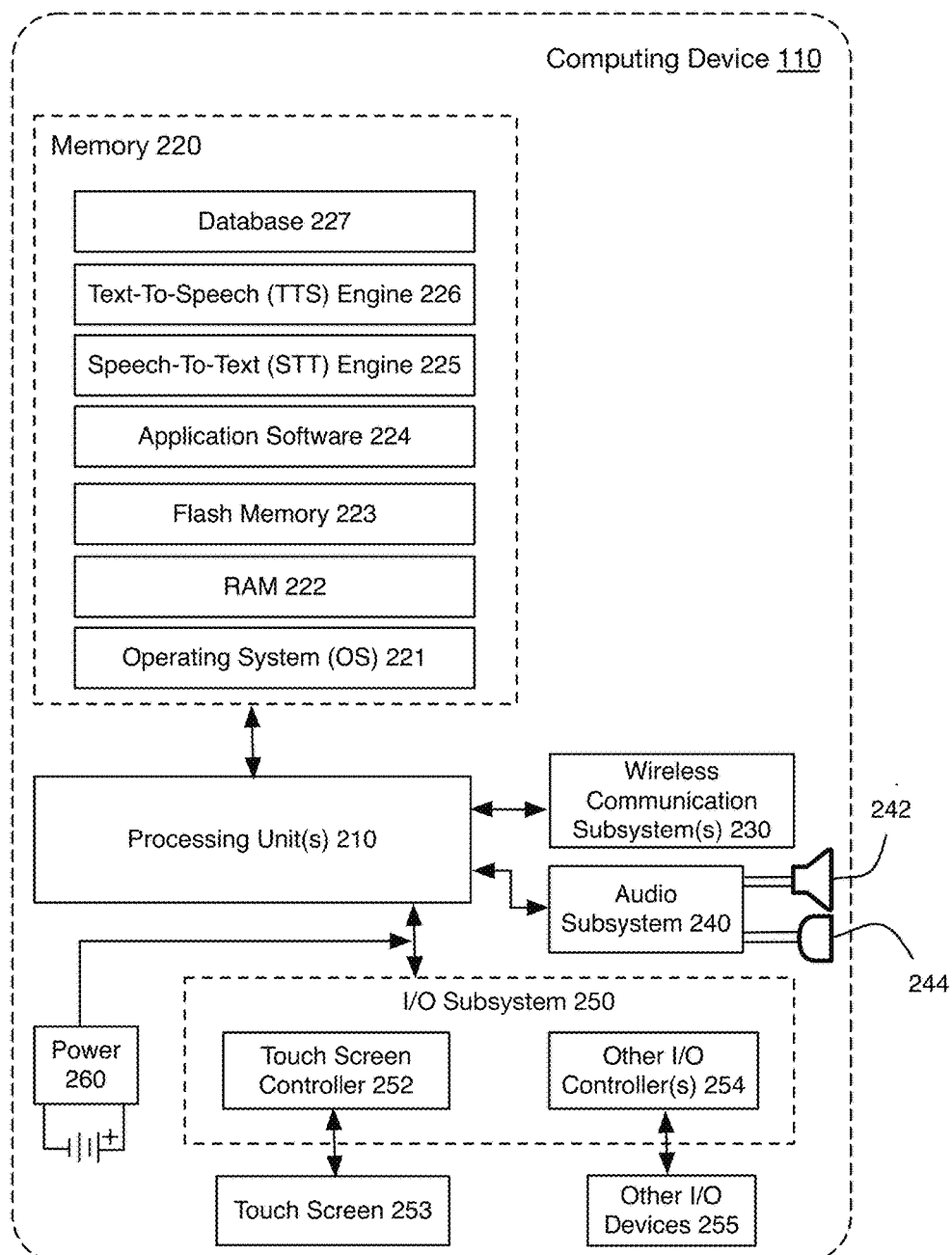
FIG. 2 is a block diagram of an illustrative computing device that may be utilized to implement the various features and processes described herein.

FIG. 2 is a block diagram of an illustrative computing device 110. As discussed above, examples of computing devices 110 include (but are not limited to) mobile computing devices, such as, for example, smart phones, tablet computers, personal digital assistants (PDAs), laptop computers, or any other portable computing devices. While a representative mobile computing device 110 is illustrated in FIG. 2, it is understood that the invention disclosed herein is not limited to mobile computing devices and is applicable to other computing devices where it is desirable to interact with and control a list of content or data by way of voice commands.

As shown, computing device 110 includes one or more processing units 210 coupled to system memory 220, and various sensors and subsystems including (but not limited to) wireless communication sub system(s) 230, audio subsystem 240, I/O subsystem 250, and power subsystem 260.

Wireless communication subsystem 230 facilitates wireless device communication functions over network 120. For example, wireless communication subsystem 230 may include one or more transmitters and receivers (not shown), which are implemented to operate over network 120.

Audio subsystem 240 is coupled to speaker(s) 242 to output audio and to microphone(s) 244 to facilitate voice-enabled functions, such as voice recognition, digital recording, telephony, etc.

I/O subsystem 250 facilitates the transfer between I/O peripheral devices, such as (but not limited to) a touch screen 253 and other I/O devices 255, and the data bus of the processing unit(s) 200. I/O subsystem 250 may include a touch screen controller 252 and other I/O controller(s) 254 to facilitate the transfer between I/O peripheral devices and the data bus of processing unit(s) 210.

The processing unit(s) 210 is coupled to system memory 220, which stores various software components or applications 224 to be executed by processing unit(s) 210. Preferably, memory 220 stores an operating system (OS) 221, which includes various procedures, sets of instructions, software components and/or drivers for controlling and managing general system tasks (e.g., memory management, storage device control, power management, etc.) and facilitates communication between various hardware and software components. System memory 220 also preferably includes RAM 222 and non-volatile flash memory 223, a combination of volatile/non-volatile memory, and/or any other type of memory.

System memory also includes a speech-to-text (STT) engine 225, which receives speech input from the user of computing device 110 via microphone 244 and audio subsystem 240. In some embodiments, the STT engine 225 uses various acoustic and language models to recognize the speech input as a sequence of phonemes, and ultimately, a sequence of words or tokens written in one or more languages. The STT engine 225 can be implemented using any suitable speech recognition techniques, acoustic models, and language models, such as (but not limited to) Hidden Markov Models, Dynamic Time Warping (DTW)-based speech recognition, and other statistical and/or analytical techniques.

System memory also includes a text-to-speech (TTS) engine 226, which converts data in the form of text to a synthesized speech output via speaker 242 and audio subsystem 240. In some implementations, the synthesized speech can be created by concatenating pieces of recorded speech that are stored in a voice database.

System memory 220 also includes at least one database 227. As will be discussed below with respect to FIG. 3, database 227 functions to store desired content and associated data in memory 220 on computing device 110. Database 227 is preferably a Structured Query Language (SQL) database.

System memory 220 also includes communication instructions to facilitate communicating with one or more additional devices; graphical user interface (GUI) instructions to facilitate GUI processing; image processing instructions to facilitate image-related processing and functions; input processing instructions to facilitate input-related (e.g., manual input) processes and functions; audio processing instructions to facilitate audio-related processes and functions; and camera instructions to facilitate camera-related processes and functions. It is understood that the communication instructions described above are merely exemplary and the system memory 220 may also include additional instructions. For example, memory 220 for a smartphone 110 may include phone instructions to facilitate phone-related processes and functions. It is also understood that the above-mentioned instructions need not be implemented as separate software programs or modules.

While the components illustrated in FIG. 2 are shown as separate components, one of ordinary skill in the art will recognize that two or more components or modules may be integrated into a single component or module. In addition, two or more components may be coupled together by one or more communication buses or signal lines. Also, while many of the functions have been described as being performed by one component or module, one of ordinary skill in the art will realize that the functions described with respect to FIG. 2 may be split into two or more components or modules.

The computing device 110 also includes one or more power source(s) 280 for powering the various hardware components of the computing device. Power source 280 may include a power management system, one or more power sources, a recharging system, a power failure detection circuit, a power converter or inverter, a power status indicator, and any other components typically associated with the generation, management and distribution of power in computing devices.

Figure 3:
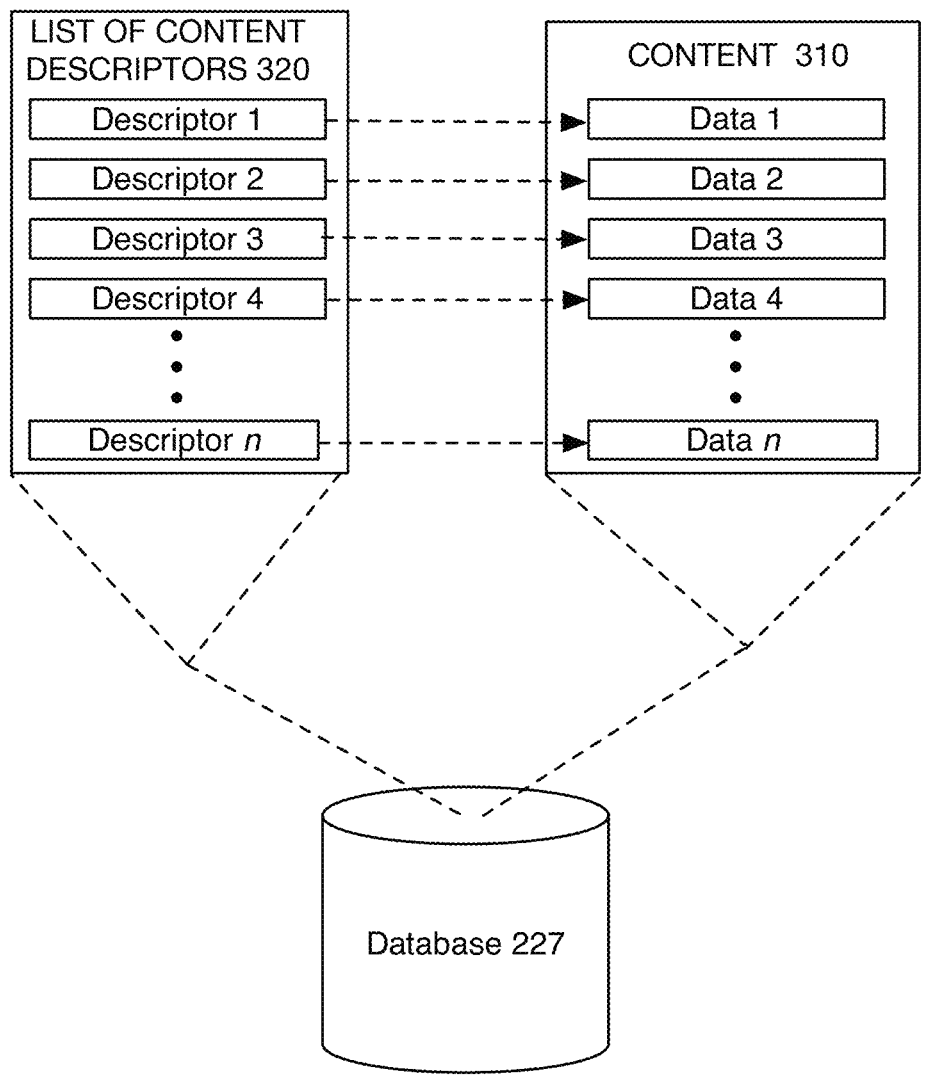
FIG. 3 is an illustrative diagram of representative descriptors and content stored in a database on a computing device.

FIG. 3 illustrates a high level representation of content and descriptors of content stored in a database 227 on a computing device 110. Content 310 refers to desired content or data items (Data 1, Data 2, Data 3, Data 4, . . . Data n) stored in memory 220 of computing device 110. In some implementations, the desired content have been downloaded by or streamed to computing device 110 over network 120 for storage in memory 220. For example, the desired content may be (but is not limited to) full text news articles obtained from third-party servers 130 (and optionally stripped of unwanted or unnecessary information by an extraction process performed by intermediate system server 140). Other examples of desired content or data items include (but are not limited to) the text associated with actual webpages corresponding to URLs identified in an Internet search, emails from an email server, etc.

An illustrative high level list of content descriptors 320 is also stored in database 227 of computing device 110. The list of content descriptors 320 includes Descriptor 1, Descriptor 2, Descriptor 3, Descriptor 4, . . . Descriptor n. Each descriptor in the list of content descriptors 320 is preferably a text-based summary or description of an associated content or data listed in content 310. For example, Descriptor 1 is a text-based summary or description of Data 1, Descriptor 2 is a text-based summary or description of Data 2, and so on. The descriptor may be, for example, a text-based headline for a news article, text appearing in the subject of an email or text message, a text-based summary of a webpage identified in the results of an Internet search, etc.

In some implementations, the descriptor in the list of content descriptors 320 may be downloaded by or streamed to the computing device 110 over network 120. By way of example only, in the context of news feeds, a user of computing device 110 could subscribe to one or more RSS feeds published by third-party news server(s) 130. The RSS feed may include text-based headlines and URLs for the actual news article associated with each headline. One or more headlines included in the RSS feed can be stored in memory 220 of computing device 110 for inclusion in the list of content descriptors 320 of database 227. An application software 224 running on computing device 110 causes the processing unit(s) 210 to send a request over network 120 to the third-party server 130 to obtain the full text of the actual news article corresponding to the URL included in the RSS feed. Once received (optionally after extracting unwanted or unnecessary content from the retrieved news article using intermediate system server 140), the full text of the news article can be stored in memory 220 of computing device 110 for inclusion in the list of content 310 of database 227.

GO (or Equivalent Simple Affirmative) Voice Command

User navigation of the application software 224 executed by processing unit(s) 210 on computing device 110 is designed so the device user need only know a limited number of simple, easily remembered voice commands ("simple voice commands"). For example, in some embodiments, the user of computing device 110 only needs to remember the following simple voice commands: GO, STOP and HELP to control application software 224. Other voice commands may also be available to the user to enable faster interaction with navigation the software application 224.

The simple affirmative voice command GO (or equivalent simple affirmative voice command) is preferably the default voice command to initiate different actions at different states within the application software 224 running on computing device 110. For example, when a user inputs a GO voice command (or equivalent simple affirmative voice command) during a pause between the TTS output of a list, the application software 224 may cause the processing unit(s) 210 to initiate a default action specific to that mode or sequence. Representative examples of default action by the processing unit(s) 210 may include (but are not limited to):

A GO voice command input may initiate the TTS output of a content (e.g., a story or article) associated with a descriptor of that content (e.g., a TTS headline in a list of headlines) that immediately preceded the GO command input.

At the end of a mode or sequence where a TTS list of available options for how to proceed are output to the user, a GO voice command initiates the action associated with the item in the list that immediately preceded the GO command input.

When presented with a TTS list of RSS Topics (e.g., world news, business, sports, entertainment, etc.), a GO voice command input may initiate a TTS output of the list of RSS sources for the topic in the TTS list of RSS Topics that immediately preceded the Go command input.

When presented with a TTS list of sources for an RSS Topic, a GO voice command may select that TTS source (e.g., The Guardian) that immediately preceded the Go command input as a channel to be stored in the user's Favorites Channel.

When presented with a TTS list of Settings, a GO voice command input may select the TTS setting (e.g., changing the speed of the TTS output) that immediately preceded the Go command input.

The STOP (or equivalent simple) voice command input allows the user of computing device 110 to interrupt action within the application software 224 and enter into an Indefinite-Length Pause ("Wait Pause") as will be described below. For example, a user of computing device 110 could input a STOP voice command during the pause(s) in the audio TTS output of a list, which would cause processing unit(s) 210 to interrupt the TTS output and remain indefinitely in a paused state until the user provides another voice command input.

The HELP (or equivalent simple) voice command input allows the user of computing device 110 to obtain a list of voice commands that are available to the user within the software application 224. Upon receipt of a HELP voice command input, the application software 224 causes processing unit(s) 210 to output a TTS list of available voice commands through speaker(s) 242. Optionally, after the user hears the desired command, the user simply provides a GO voice command (or equivalent affirmative simple voice command) input to cause the processing unit(s) 210 to invoke the desired command within software application 224.

Pauses

Pauses introduced in the navigation of application software 224 provide the user with the time needed to input a voice command. Because a pause results in the absence of sound and occurs naturally during presentation of speech, the pause may be preceded by a short tone to alert the user to the imminent pause. In addition, the pause may also be followed by a short tone to habituate the user to a predefined length of time (t) of the pause and remove the sense of randomness to the length of the pause.

In some embodiments, there may be two types of pauses—a List-With-A-Defined-Length Pause ("List Pause") and an Indefinite-Length Pause ("Wait Pause")—to facilitate user interaction with the application software 224 executed by processing unit(s) 210 on computing device 110. The List Pause is preferably set for a short, predefined length of time (t) (e.g., 1.5 seconds-4 seconds) and used predominantly throughout the application software 224. The Wait Pause often occurs at the end of a List Pause or after the user inputs a STOP voice command with a List Pause.

List Pause

In some embodiments, the application software 224 executed by processing unit(s) 210 on computing device 110 may provide two or more types of lists to the user. The first list type may be the Content List 310 or List of Content Descriptors 320 (e.g., short content, such as (but not limited to) headlines, names of songs, etc.; and/or longer content divided into segments (e.g., one or more paragraphs) separated with a pause, such as (but not limited to) stories, articles, etc.). The second list type may be a Navigational List that presents options to the user to navigate throughout the application software 224.

With the Content List, List of Content Descriptors or Navigational List, the application software 224 preferably causes the processing unit(s) 210 to initiate the audio output of each TTS item in the list followed by a short List Pause for a predefined length of time (t) to allow sufficient time for the user of computing device 110 to interact with the list (or a story/article divided into segments) and control movement within the list or content. The predefined pause time (t) may be a fixed time (e.g., about 2.5 seconds) programmed in the application software 224, or it can be a specific time (t) selected by the user of computing device 110 from a range of available pause times (e.g., from about 1.5 seconds to about 4 seconds). In addition to the GO command (or equivalent affirmative simple voice command), other simple voice commands that may also be available for the user to interact and control the list or content may include (but are not limited to) RESTART, REPEAT, GO-BACK, SKIP, NEXT and/or PREVIOUS, as well as SAVE and/or DELETE.

In addition, the short List Pause facilitates the user to input an affirmative simple voice command (e.g., GO or an equivalent affirmative voice command) to initiate a default action specific to that mode or sequence by the application software 224, such as (but not limited to) select and TTS output of the associated content (story, article, etc.), or to initiate the action associated with an item in a Navigational List, such as, by way of example only:

"When you hear your selection, say GO"
[1] "Choose another Channel within the current Topic"
[Tone, List Pause, Tone]
[2] "Go back to the list of Topics"
[Tone, List Pause, Tone]
[3] "Exit and go back to where you were"
[Tone, List Pause, Tone]

With respect to TTS output of longer content, it is preferred to divide longer content into segments (e.g., paragraphs or groups of paragraphs) and insert a List Pause between the TTS output of each segment. The List Pause between TTS output of segments of longer content facilitates the following non-limiting conveniences for the user of computing device 110:

Speakerphone use with longer content control with the use not needing to wait until the conclusion of the longer content, thereby allowing the user to move back and forth throughout the longer content. This is important because most voice "finger" print commands, such as "Hey-Siri®" are not available outside of the manufacturer's use and speakerphone audio interruption by voice commands is not always possible, causing a TTS loopback issue.

Enables changing to other modes in the application software 224 without having to listen to the entire TTS output of the longer content, as well as when using the speakerphone without causing a TTS loopback issue.

Enables changing to Settings to control the TTS playback of the longer content, as well as when using the speakerphone without causing a TTS loopback issue.

Introducing a List Pause improves the overall experience for TTS output of longer content by providing control over the longer content during speakerphone playback. This contrasts with other forms of audio broadcast (e.g., radio) and other audio recordings.

Wait Pause

When a user of computing device 110 encounters a Wait Pause, the application software 224 has paused indefinitely and preferably remains in the paused state until the user provides a voice command input. In some embodiments, this can occur at the end of TTS output of a Navigational List with the user not initiating changing to a different mode and the application software 224 remaining in wait state. When the user inputs a GO or other affirmative voice command during the Wait Pause, the application software 224 may provide the user with TTS instructions as to how to proceed, such as, by way of example only:

"You are in Extended Help with Commands for Channel Mode while the news reader application software is Paused"
"After you hear your selection and the Listen Tone, say GO"
[1] "Exit Extended Help and return to Current Channel."
[Tone, List Pause, Tone]
[2] "Return to General Command Help."
[Tone, List Pause, Tone]
[3] "Read the list of available commands for Channel Mode."
[Tone, List Pause, Tone]
[4] "Restart Extended Command Help for Channel Mode"
[Tone, List Pause, Tone]

A Wait Pause may also occur when the user of computing device 110 inputs a STOP voice command. The application software 224 causes the processing unit(s) 210 to then change to the Wait Pause, preferably preceded by a tone. The tone preceding the Wait Pause is preferably a different tone than the one preceding the List Pause to indicate to the user that they are in a different pause state.

The Wait Pause that occurs after the STOP command enables the user to navigate to other modes within the application software 224 using additional voice commands, such as, for example, HEADLINES, STORIES, CHANNELS and SETTINGS. If the user is in a Wait Pause during the TTS output of content (e.g., playback of a story or article), the user may input a GO (or other affirmative) voice command, which default action specific to that mode or sequence may be to continue the TTS output of the paused content. In addition to the GO voice command, the user may use other List control simple voice commands, such as (but not limited to) RESTART, REPEAT, GO-BACK, SKIP, NEXT, PREVIOUS and/or HELP.

A GO affirmative voice command input (or equivalent simple affirmative voice command) following a Wait Pause may cause the processing unit(s) 210 to initiate the TTS output of a list, such as (but not limited to) an entire list of headlines, with each item in the list separated by a List Pause; continue the TTS output of a paused story (which may represent segments or paragraphs of TTS content); or merely "awaken" the application software 224 from the indefinite-length Wait Pause to inform the user of their "location" in the application software, such as the sequence in which the user resides in the application software, and initiating the TTS output to the user of available options, such as (but not limited to) to remain or change to a different mode within the application software.

Figure 4:
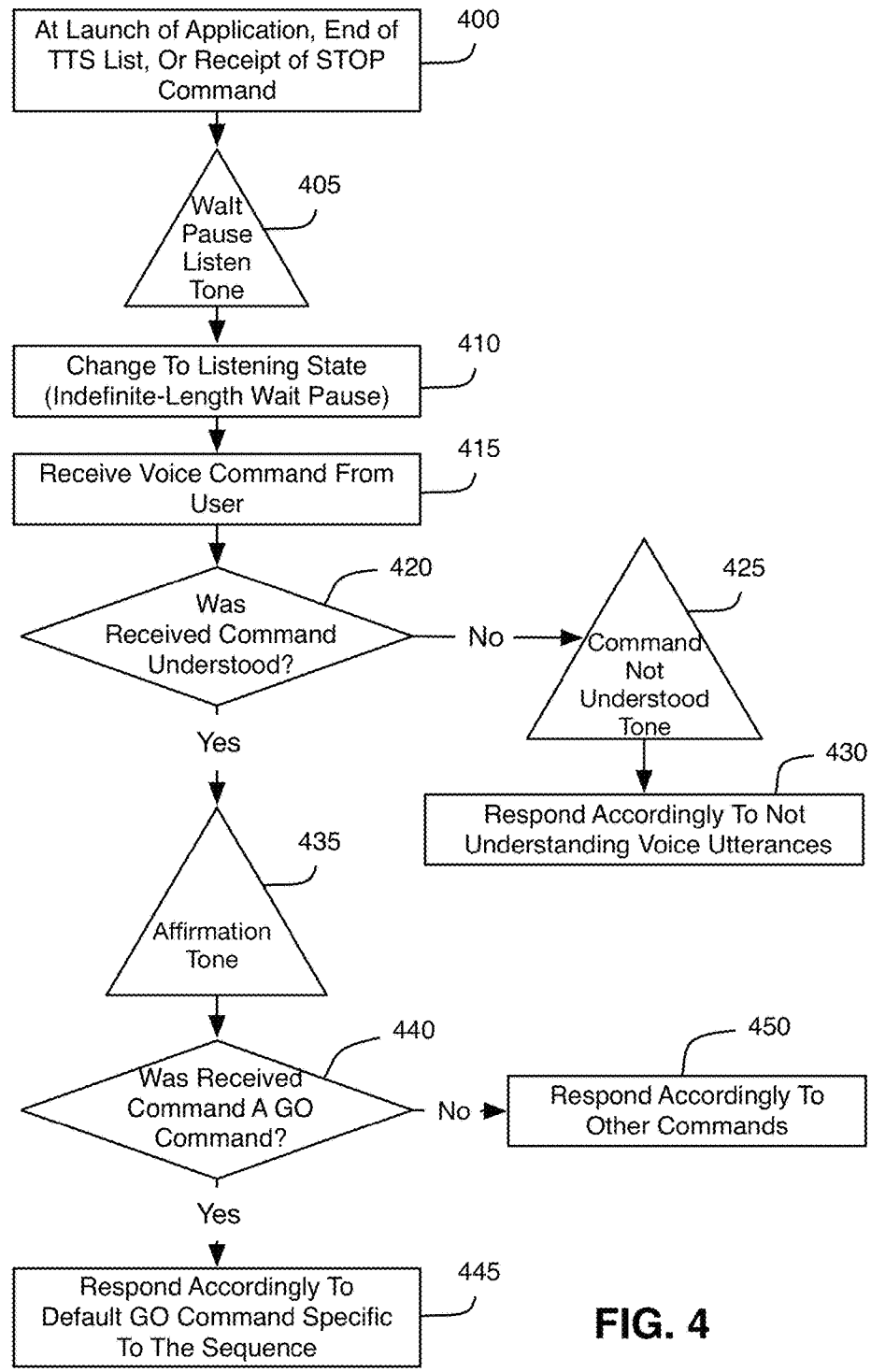
FIG. 4 is an illustrative flow diagram of an example implementation of a Wait Pause with the voice command-driven database.

FIG. 4 is an illustrative flow diagram of an example implementation of a Wait Pause (described above) with the voice command-driven database 227. While not illustrated in FIG. 4, the process described below may be initiated, for example, in response to a voice command input by the user using microphone(s) 244 of the computing device 110, or in response to some other action or event occurring while the application software 224 is running on computing device 110. For example, let's assume that one of the following has occurred that will result in the application software 224 causing the processing unit(s) 210 to enter into a Wait Pause: the application software 224 has just been launched by the user on the computing device 110, the processing unit(s) 210 have completed audio output of a TTS list (e.g., content descriptors, content, available commands, etc.) through speaker(s) 242, or received a STOP voice command input from the user via microphone(s) 244 (Step 400). In response, the processing unit(s) 210 causes the audio subsystem 240 to output an audible listen tone—a Wait Listen Tone in this example—to the user through speaker(s) 242 of computing device 110 (Step 405).

The application software 224 causes the processing unit(s) 210 to change to a listening state to detect an audible voice command input by the user (Step 410). In the example illustrated in FIG. 4, the listening state 410 is an indefinite-length Wait Pause, where the application software 224 has paused indefinitely and preferably remains in the paused state until the user provides a voice command input. Wait Listen Tone (Step 405) is preferably a distinctive tone, such as, for example, a double tone or the like, to indicate to the user of computing device 110 that the application software 224 is paused indefinitely and waiting for a voice command input from the user.

Once the user provides a voice command input via microphone(s) 244 (Step 415), the STT engine 225 converts the received voice command input from speech-to-text (STT) for processing by processing unit(s) 210. If the received voice command input is not understood (Step 420), then the processing unit(s) 210 causes the audio subsystem 240 to output a Command Not Understood Tone through speaker(s) 242 (Step 425). The Command Not Understood Tone is preferably distinct from Wait Listen Tone (Step 405) or other tones so that the user may recognize that the STT voice command was not understood by the system. The application software 224 then causes the processing unit(s) 210 to respond accordingly to not understanding a voice utterance (Step 430). The response may be, for example, a TTS output indicating that the voice command input was not understood, or a TTS output of a list of voice commands available to the user at that location or sequence within application software 224 with a List Pause of a predefined time (t) between each item in the list to allow the user time to provide a GO voice command (or equivalent simple affirmative voice command) input after hearing the TTS output of the desired item in the list.

If the converted STT voice command is understood (Step 420), then the processing unit(s) 210 causes the audio subsystem 240 to output an Affirmation Tone through speaker(s) 242 (Step 435). The Affirmation Tone is preferably distinct from Wait Listen Tone (Step 405), Command Not Understood Tone (Step 425) and any other tones so that the user may recognize that the STT voice command was understood by the system. The processing unit(s) 210 determines whether the received simple voice command input was a GO (or equivalent affirmative) voice command (Step 440). If the processing unit(s) 210 determines that the received voice command was a GO (or equivalent affirmative) command, then the processing unit(s) 210 processes and responds accordingly to the received default GO Command (Step 445). Alternatively, if the processing unit(s) 210 determines that a simple voice command other than a GO command (e.g., RESTART, RESTORE, CHANNELS, STORIES, SETTINGS, HELP, etc.) is received from the user (Step 440), then the processing unit(s) 210 processes the received other voice command and responds accordingly (Step 450).

Figure 5:
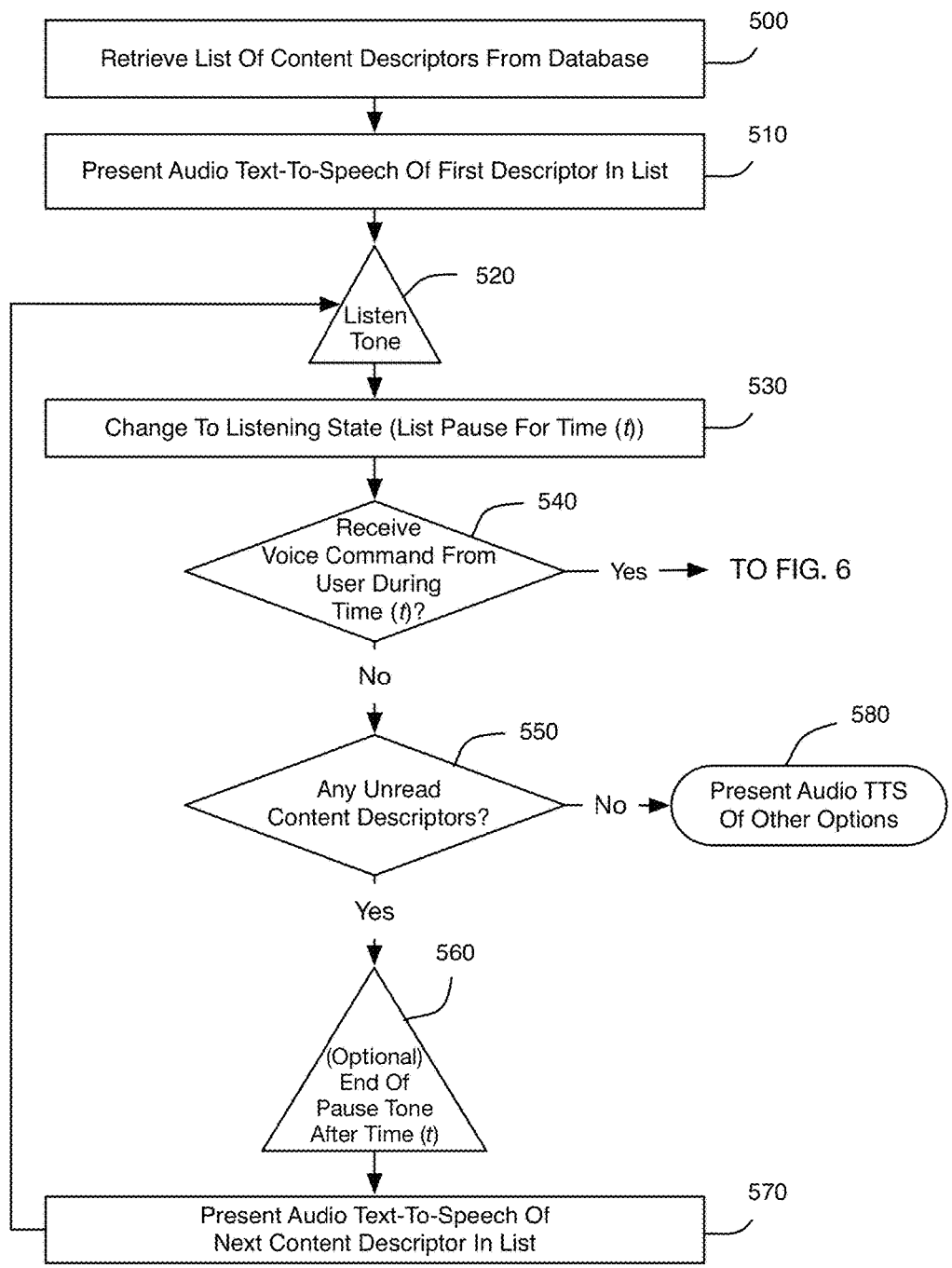
FIG. 5 is an illustrative flow diagram of an example implementation of a List Pause with the voice command-driven database.
Figure 6:
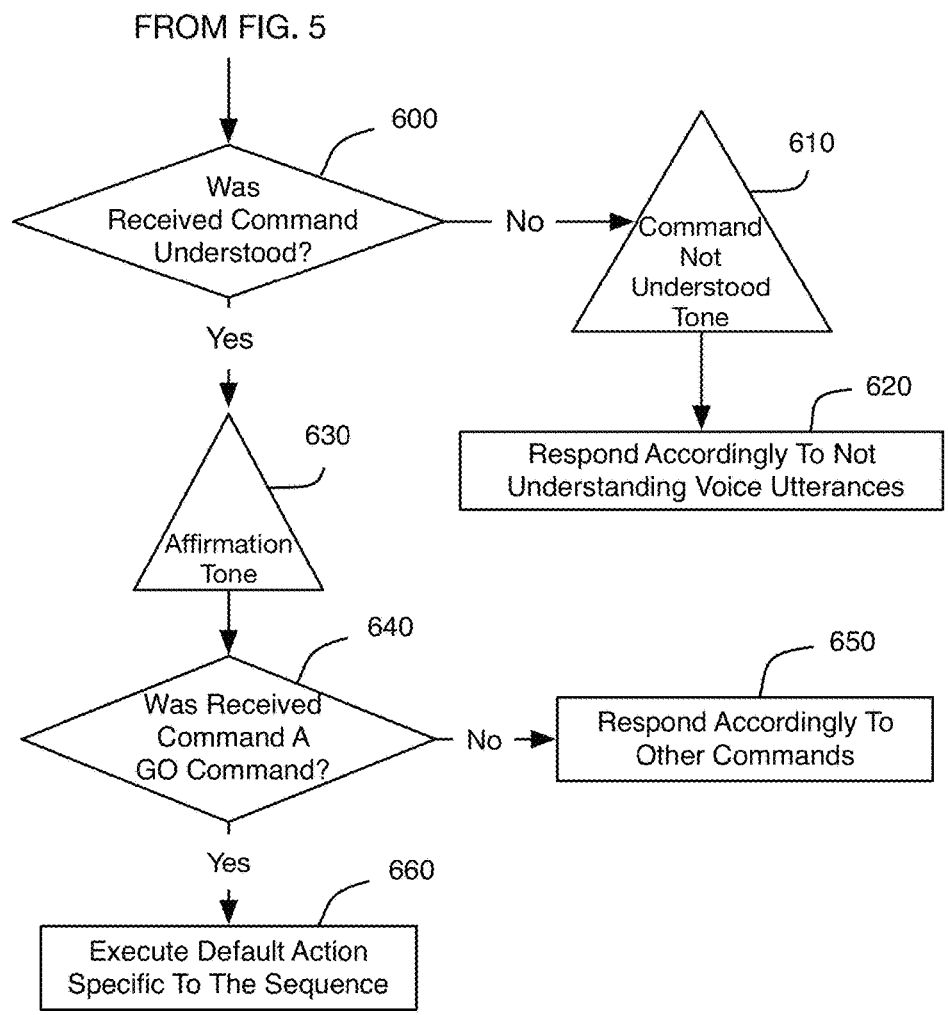
FIG. 6 is a continuation of the illustrative flow diagram of the example implementation of FIG. 5.

FIGS. 5 and 6 are an illustrative flow diagram of an example implementation of a List Pause (described above) with the voice command-driven database 227. While not illustrated in FIG. 5, the process described below may be initiated, for example, in response to a voice command input by the user using microphone(s) 244 of the computing device 110, or in response to some other action or event occurring while the application software 224 is running on computing device 110. It is understood that the computing device 110 does not require a connection to network 120 to perform the steps illustrated in FIGS. 5 and 6. In this example, the application software 224 causes the processing unit(s) 210 to retrieve the list of content descriptors 320 residing in database 227 (Step 500). Once retrieved, the processing unit(s) 210 may cause the TTS engine 226 and audio subsystem 240 to provide an audio output of a first content descriptor (e.g., Descriptor 1) in the list of content descriptors 320 to the user through speaker(s) 242 (Step 510). For purposes of this disclosure, the first content descriptor refers to text of the first content descriptor retrieved for TTS output from the list 320, but is not necessarily the first content descriptor in the list 320.

After audio output of the first content descriptor (e.g., Descriptor 1 of FIG. 3) retrieved from the list of content descriptors 320 is completed, the processing unit(s) 210 may cause the audio subsystem 240 to output an audible listen tone through speaker(s) 242 (Step 520) and change to a List Pause listening state for a predefined time (t) to detect an audible voice command input from the user (Step 530). The List Pause listen tone (Step 520) is preferably a distinct audible tone (e.g., a single tone or the like) from the audible Wait Pause Listen Tone (Step 405), Command Not Understood Tone (Step 425) and Affirmation Tone (Step 435) described above with respect to FIG. 4, to indicate to the user of computing device 110 that the application software 244 is in a List Pause state that will time out after pause time (t) if the user does not provide a voice command.

If no voice command input is received during the predefined pause time (t) (Step 540), then the processing unit(s) 210 determines whether there remain any content descriptors (e.g., Descriptors 2, Descriptor 3, Descriptor 4, . . . Descriptor n) in the list of content descriptors 320 that have not been TTS output to the user through speaker(s) 242 (Step 550). If there are descriptors remaining that have not been TTS output to the user (Step 550), then the processing unit(s) 210 may optionally cause the audio subsystem 240 to output an end of pause tone to be through speaker(s) 242 of computing device 110 (Step 560). The end of pause tone (Step 560) is preferably audibly distinct from the List Pause listen tone, Wait Pause listen tone, Command Not Understood tone and Affirmation tone, so that the user of computing device 110 can differentiate between them.

If there are content descriptors remaining from the retrieved list 320 that have not been TTS output to the user (Step 550) or after output of the optional end of pause tone (Step 560), the processing unit(s) 210 causes the TTS engine 226 to convert a next content descriptor in the retrieved list of content descriptors 320 for audio output to the user through audio subsystem 240 and speaker(s) 242 (Step 570). The process in Steps 520-570 is repeated until either a voice command input is received from the user through microphone(s) 244 (Step 540), or a predefined number or all of the descriptors (e.g., Descriptor 3, Descriptor 4, . . . Descriptor n of FIG. 3) in the retrieved list of content descriptors 320 have been converted from text-to-speech by the TTS engine 226 and output to the user through audio subsystem 240 and speaker(s) 242. In the latter case, the processing unit(s) 210 may optionally cause the TTS engine 226 to provide an audio output to the user through audio subsystem 240 and speaker(s) 242 as to other options from which the user may provide voice command input (Step 580). It is understood that the retrieval and TTS output of the content descriptors within the list of content descriptors 320 can be sequentially, random or any order desired. The important aspect is the retrieval and TTS output of descriptors in the list 320, not the order in which the descriptors are retrieved and output to the user.

Referring to FIG. 6, if a voice command input from the user is received during the pause time (t) (Step 540 in FIG. 5), then the processing unit(s) 210 causes the STT engine 225 to convert the input from speech-to-text (STT) for processing by processing unit(s) 210. If the received voice command input is not understood (Step 600), then the processing unit(s) 210 causes the audio subsystem 240 to output a Command Not Understood tone through speaker(s) 242 (Step 610). The Command Not Understood tone is preferably distinct from List Pause listen tone, Wait Pause listen tone, Command Not Understood tone, Affirmation tone and optional End of Pause tone so that the user may recognize that the STT voice command was not understood by the system. The application software 224 then causes the processing unit(s) 210 to respond accordingly to not understanding a voice utterance (Step 620). The response may be, for example, a TTS output indicating that the voice command input was not understood, or a TTS output of a list of voice commands available to the user at that location within application software 224.

If the converted STT voice command is understood (Step 600), then the processing unit(s) 210 causes the audio subsystem 240 to output an Affirmation Tone through speaker(s) 242 (Step 630), which informs the user that the voice command input was understood by the system. The Affirmation Tone is preferably distinct from List Pause listen tone, Wait Pause listen tone, Command Not Understood tone and optional End of Pause tone so that the user may recognize that the STT voice command was understood by the system.

The application software 224 causes the processing unit(s) 210 to determine whether the received voice command input was a GO command (or equivalent affirmative voice command) (Step 640). If the processing unit(s) 210 determines that a voice command other than a GO command (e.g., RESTART, RESTORE, CHANNELS, STORIES, SETTINGS, HELP, etc.) is received from the user (Step 640), then the processing unit(s) 210 processes the received other voice command and responds accordingly (Step 650). Alternatively, if the processing unit(s) 210 determines that the received voice command was a GO command (or equivalent affirmative command), then the application software 224 causes the processing unit(s) 210 to execute default action specific to that mode or sequence (Step 660).

Figure 7:
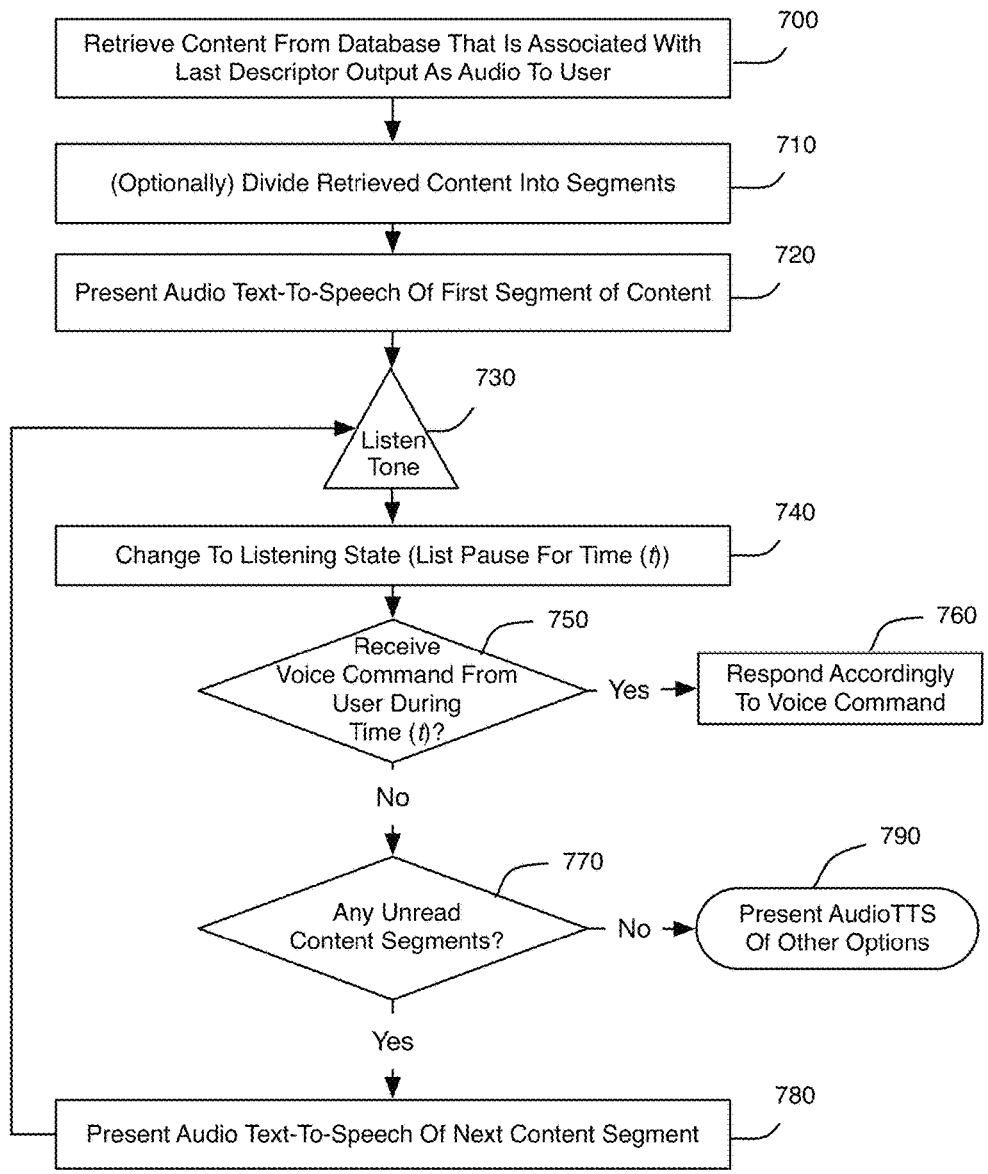
FIG. 7 is an illustrative example of a default action of FIG. 6.

An illustrative example of a default action is illustrated in FIG. 7. In this illustrative example, the default action (Step 660 of FIG. 6) may be (but is not limited to) retrieving the content (e.g., Data n) from the list of content 310 (FIG. 3) that is associated with last descriptor (e.g., Descriptor n) in the list of content descriptors 320 output to the user as text-to-speech through speaker(s) 242 (Step 700). Once retrieved, the processing unit(s) 210 may cause the TTS engine 226 and audio subsystem 240 to provide an audio output of the retrieved content (e.g., Data n) to the user through speaker(s) 242 (Step 730). In some embodiments, processing unit(s) 210 may divide the retrieved content (e.g., Data n) into segments (e.g., by paragraphs, number of words or lines, or the like) (Step 710) and cause the TTS engine 226 to provide an audio output of one segment (or group of segments) at a time (Step 720). After audio output of one segment (or a grouping of segments) of the retrieved content is completed, the processing unit(s) 210 may cause the audio subsystem 240 to output an audible listen tone through speaker(s) 242 (Step 730) and change to a List Pause listening state for a predefined time (t) to detect an audible voice command from the user (Step 740).

If a voice command input from the user is received during the pause time (t) (Step 750), then the processing unit(s) 210 causes the STT engine 225 to convert the input from speech-to-text and the application software 224 responds according to the received voice command input (Step 760). By way of example only, the received voice command input may be other simple voice commands, such as (but is not limited to) RESTART, GO-BACK, SKIP, HELP, SETTINGS, STOP, etc.

If no voice command input is received during the pause time (t) (Step 750), then the processing unit(s) 210 determines whether there remain any segments of the retrieved content that have not been TTS output to the user through speaker(s) 242 (Step 770). If there are content segments remaining that have not been output to the user (Step 670), then the processing unit(s) 210 causes the TTS engine 226 to convert the next segment (or group of segments) of the retrieved content for audio output to the user through speaker(s) 242 (Step 780). The process in Steps 730-780 is repeated until either a voice command is received from the user through microphone(s) 244 (Step 750), or all (or a predefined number of) segments of the retrieved content have been converted from text-to-speech by the TTS engine 226 and output to the user through speaker(s) 242. In the latter case, the processing unit(s) 210 may optionally cause the TTS engine 226 to provide an audio output to the user through speaker(s) 242 as to other options from which the user may provide voice command input (Step 790).

Figure 8:
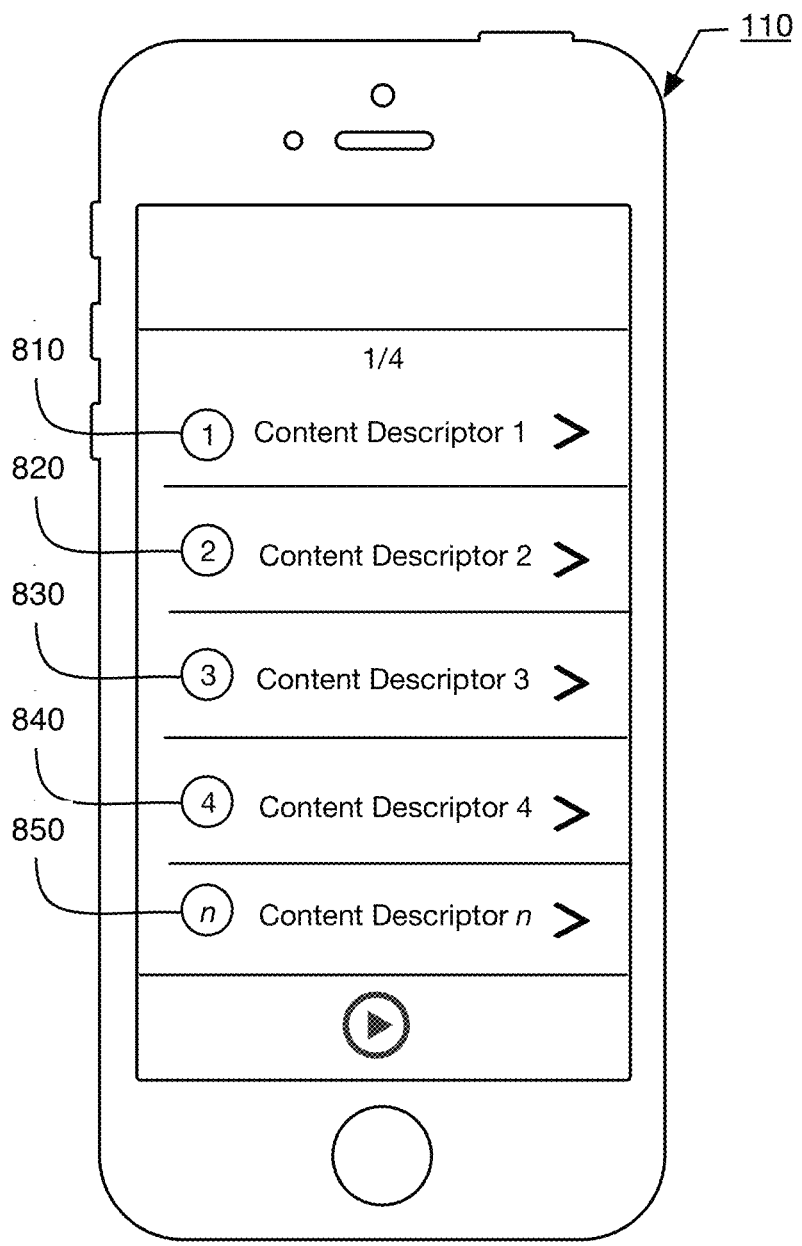
FIG. 8 is an example graphical user interface (GUI) displayed on a computing device to provide a visual display of all or a part of the list available for audio output in response to a user voice command.

FIG. 8 illustrates an example graphical user interface (GUI) displayed on a computing device 110 to provide a visual display of all or a part of the list of content descriptors 320 available for audio output in response to a user voice command with additional output beyond the viewing area of the display screen. For instance, Content Descriptor 1 (810) corresponds to Descriptor 1 in the list of content descriptors 320 (FIG. 3). Content Descriptor 2 (820) corresponds to Descriptor 2 in the list of content descriptors 320 (FIG. 3). Content Descriptor 3 (830) corresponds to Descriptor 3 in the list of content descriptors 320 (FIG. 3). Content Descriptor 4 (840) corresponds to Descriptor 4 in the list of content descriptors 320 (FIG. 3). Content Descriptor n (850) corresponds to Descriptor n in the list of content descriptors 320 (FIG. 3).

Figure 9:
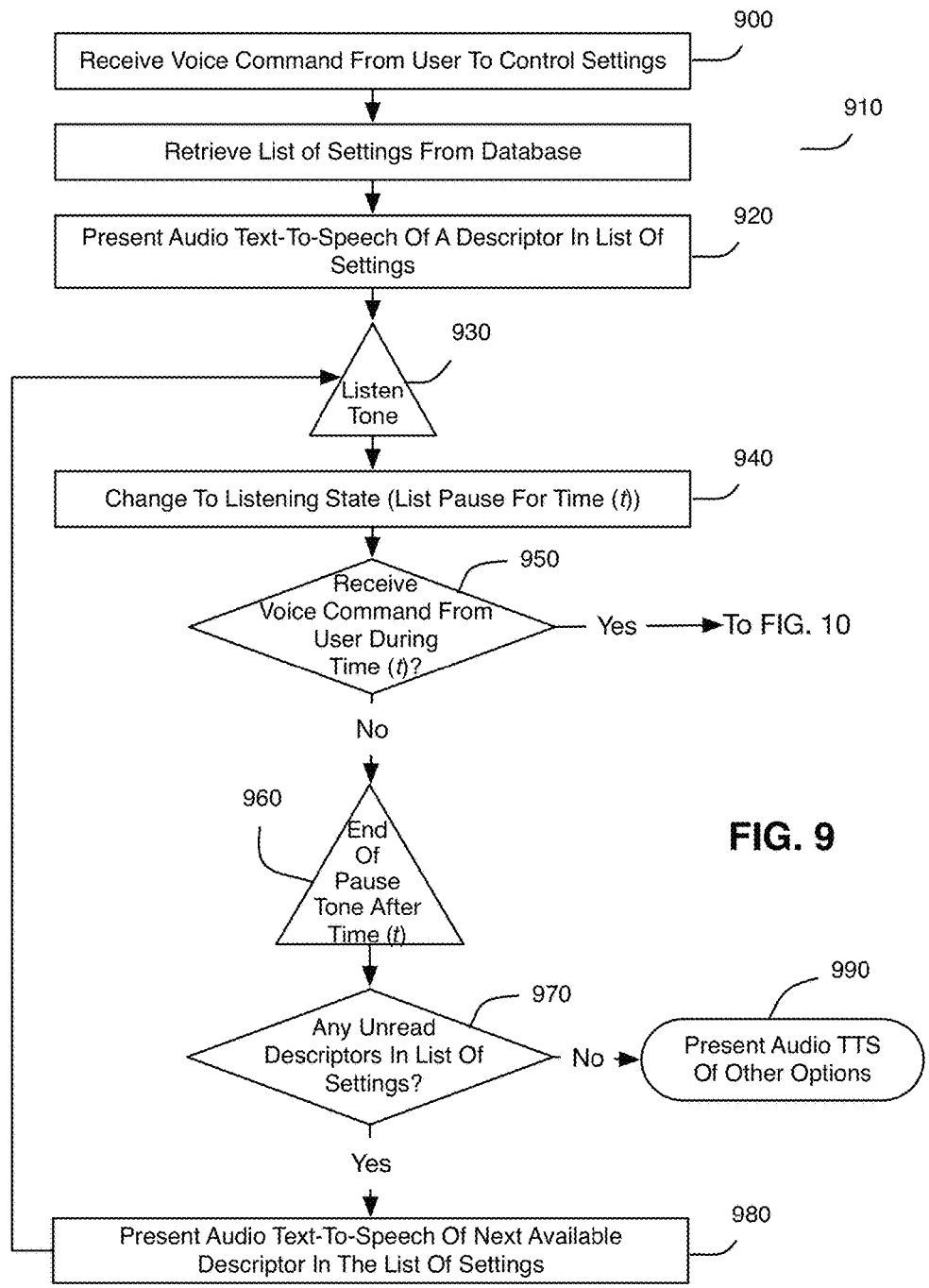
FIG. 9 is an illustrative flow diagram of another example implementation of the voice command-driven database.
Figure 10:
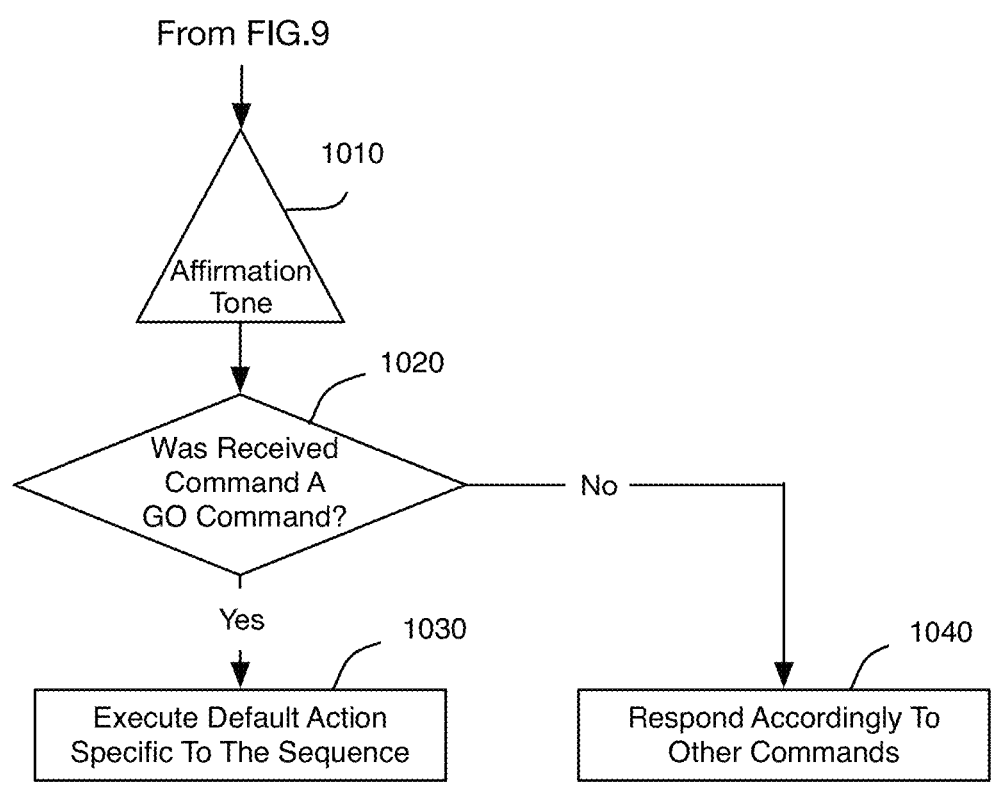
FIG. 10 is a continuation of the illustrative flow diagram of the example implementation of FIG. 9.

FIGS. 9 and 10 are an illustrative flow diagram of another example implementation of the voice command-driven database 227. In this illustrative example, a user of computing device 110 can control settings on the device using voice commands. The user of computing device 110 may input a voice command such as, for example, "Settings," through microphone(s) 244 (Step 900). The STT engine 225 converts the voice command input into text for processing by processing unit(s) 210, which determines that the user has selected "Settings." The application software 224 running on computing device 110 causes the processing unit(s) 210 to retrieve a list of settings from database 227 (Step 910). The list of settings may include short descriptors for each setting that a user can control on the computing device 110, such as (but not limited to) "Play Back Speed," "Pause Length," "Volume," "Choosing a Voice," "Language," etc. The processing unit(s) 210 may optionally cause the TTS engine 226 to provide an audio output to the user through speaker(s) 242, such as, for example, "After you hear the setting that you wish to select, say GO."

The processing unit(s) 210 causes the TTS engine 226 to convert the descriptor for one of the settings (e.g., the first descriptor in the list of settings, such as "Play Back Speed") in the list of settings for audio output to the user through speaker(s) 242 (Step 920). After audio output of the converted descriptor is completed, the processing unit(s) 210 causes an audible listen tone to be output through speaker(s) 242 of computing device 110 (Step 930). The application software 224 causes the processing unit(s) 210 to change to a listening state for a predefined pause time (t) to detect an audible voice command from the user (Step 940). As discussed above, the predefined pause time (t) may be a fixed time (e.g. 2.5 seconds) programmed in the application software 224, or it can be a specific time (t) selected by the user of computing device 110 from a range of available pause times (e.g., from 1.5 seconds to 4 seconds).

If no audible command is received during the predefined pause time (t) (Step 950), then the processing unit(s) 210 causes an audible end of pause tone to be output through speaker(s) 242 of computing device 110 (Step 960). The end of pause tone (Step 960) is preferably audibly distinct from the listen tone (Step 930) so that the user of computing device 110 can differentiate between them. After the end of pause tone (Step 960), the processing unit(s) 210 determines whether there are any additional descriptors in the list of settings that have not been text-to-speech output or otherwise presented to the user of the device 110 (Step 970). If yes, the processing unit(s) 210 causes the TTS engine 226 to convert the next descriptor in the list of settings (e.g., the second descriptor in the list of settings, such as "Pause Length") for audio output to the user through speaker(s) 242 (Step 980), and the processing unit(s) 210 again causes the audio subsystem 240 to output an audible listen tone through speaker(s) 242 of computing device 110 (Step 930). After the listen tone (Step 930), the application software 224 causes the processing unit(s) 210 to change to a List Pause listening state for the predefined pause time (t) to detect an audible voice command from the user (Step 940).

The loop in Steps 930-980 continues until either a voice command input is received from the user of the computing device 110 (Step 950), a predefined number of descriptors have been output to the user, or there are no unread descriptors remaining in the list of settings (Step 970). If the latter, then the application software 224 causes the processing unit(s) to end the process, or provide an audio text-to-speech output to the user through the TTS engine 226, audio subsystem 240 and speaker(s) 242 of other options available for user selection, control or action (Step 990). These other options may be present to the user in the form of a TTS list of options, where the processing unit(s) 210 causes the audio subsystem 240 to output an option in the list through speaker(s) 242 followed by a List Pause for a time (t). If no voice command input is received after time (t), then the processing unit(s) 210 causes the audio subsystem 240 to output the next option in the list through speaker(s) 242. This process would continue until either the processing unit(s) 210 receive a GO voice command (or equivalent affirmative command) input from the user indicating the user's selection of the last option in the list that was output to the user through speaker(s) 242, or all options in the list have been TTS output to the user. In this manner, the user may, for instance, encounter a Wait Pause and remain in Settings or move to another mode in the application software 224 through the input of the affirmative, default GO voice command.

Referring to FIG. 10, if a voice command input is received within the pause time (t) from the user through microphone(s) 244 (Step 950 of FIG. 9), then the voice command input is converted to text by the STT engine 225 and the processing unit(s) 210 causes an audible affirmation tone to be output through speaker(s) 242 of computing device 110 (Step 1010). The affirmation tone is preferably audibly different from the listen tone and end of pause tone so that the user can differentiate from the other audible tones.

If the received voice command in Step 950 was a GO command (or equivalent affirmative voice command) (Step 1020), the application software 224 causes the processing unit(s) 210 to execute default action (Step 1030). Alternatively, if the received voice command was not a GO command (or equivalent affirmative voice command) (Step 1020), the application software 224 causes the processing unit(s) 210 to respond according to the other voice command received (Step 1040). Examples of other simple voice commands that may be available to the user in this illustrative example include (but are not limited to) STOP, GO-BACK, REPEAT, EXIT, etc.

By way of example only, the default action (Step 1030) might be (but is not limited to) providing an audio text-tospeech (TTS) output of another list of options available to the user with respect to the specific setting descriptor that was selected by the user with a GO voice command input. For instance, if the received voice command input was a GO command (Step 1020) following the audio text-to-speech output of the setting "Pause Length," then the application software 224 may cause the processing unit(s) 210 to retrieve a numerical list of times (t) (e.g., $t_1$, $t_2$, $t_3$, $t_4$, etc.) from which the user may select the desired pause length (t) (Step 910). The processing unit(s) 210 causes the TTS engine 226 to convert an initial pause-length time (e.g., $t_1$) in the retrieved list of pause-length times (t) for audio output to the user through speaker(s) 242. After audio output of the converted initial pause-length time is completed, the processing unit(s) 210 causes the audio subsystem 240 to output an audible listen tone through speaker(s) 242 of computing device 110 and changes to a List Pause listening state for the predefined or default pause-length time (t) to detect an audible voice command from the user.

If no voice command input is received after the default pause time (t), then the processing unit(s) causes an end of pause tone to be output to the user through speaker(s) 242. If additional pause-length times (e.g., $t_2$, $t_3$, $t_4$, etc.) are available in the retrieved list of pause times, then the processing unit(s) 210 causes the TTS engine 226 to convert the next pause-length time (e.g., $t_2$) in the retrieved list of pause times for audio output to the user through speaker(s) 242, and the processing unit(s) 210 again causes the audio subsystem 240 to output an audible listen tone through speaker(s) 242 of the computing device 110.

After the listen tone (Step 930), the application software 224 causes the processing unit(s) 210 to change to a listening state for the default pause time (t) to detect an audible voice command from the user. This loop continues until either a GO command (or equivalent affirmative voice command) input is received from the user, which, in this example, may be to set the pause-length time (t) to the pause-length time (e.g., $t_2$) output to the user through speaker(s) 242 that immediately preceded the GO voice command.

In an alternative implementation, after the initial pause-length time (e.g., $t_1$) from the list of pause-length times (t) is output to the user through speaker(s) 242, the user could input a voice command, such as (but not limited to) "Shorter" or "Longer," through microphone(s) 244, which would be converted to text by the STT engine 225 and processed by the processing unit(s) 210. Depending on the received voice command input, the application software 224 may cause the processing unit(s) to select a shorter or longer List Pause length time (t) from the retrieved list of pause-length times for text-to-speech output to the user through speaker(s) 242. The application software 224 may continue to provide "shorter" or "longer" TTS until the user hears the desired pause-length time. Once the user hears the desired pause-length time, the user may input a GO voice command (or equivalent simple affirmative voice command) through microphone(s) 244 and the processing unit(s) 210 may set the List Pause length time (t) to the desired pause-length time (e.g., $t_2$) output to the user through speaker(s) 242 that immediately preceded the affirmative simple voice command (e.g., a GO voice command) input.

It is understood that the example above is illustrative and that the invention is not intended to be limited to a particular list stored in a database or specific voice commands. For example, instead of adjusting "Pause Length," the user may adjust the speed of the TTS output by the TTS engine 226 by providing a GO voice command input (Step 1020) following the audio text-to-speech output of the setting "Voice Speed." In that case, the application software 224 may cause the processing unit(s) 210 to retrieve a numerical list of voice speeds (v) and present the user with a TTS output of each speed (e.g., $v_1$, $v_2$, $v_3$, $v_4$, etc.) in the list, from which the user may select the desired speed (v) by providing the affirmative GO voice command (or an equivalent affirmative voice command) through microphone(s) 244 after hearing the audio TTS output of the desired speed (Step 910).

Figure 11A:
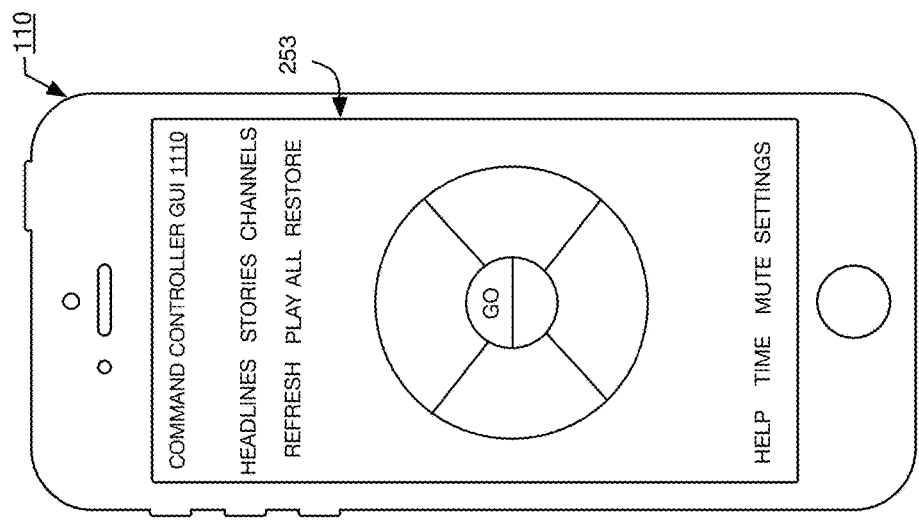
FIG. 11A illustrates the example command controller GUI of FIG. 11 displaying active voice commands available to a user.
Figure 11:
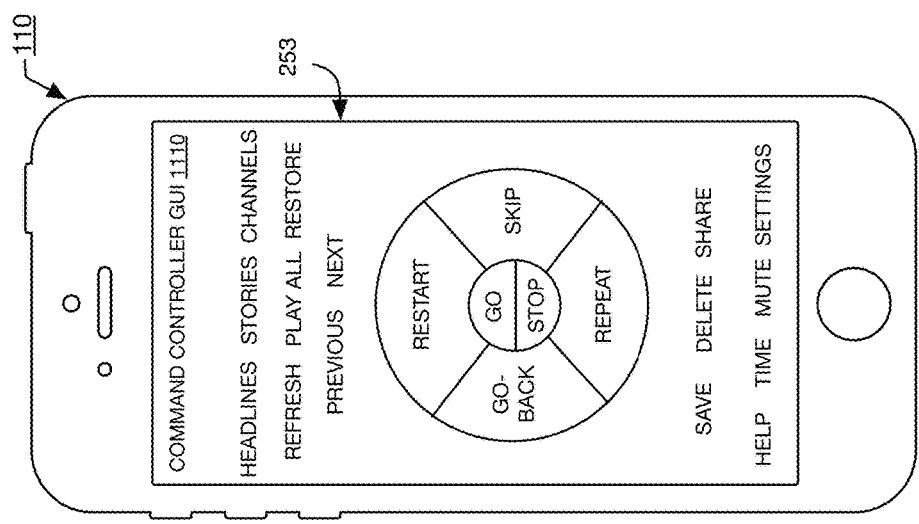
FIG. 11 is an example GUI of a command controller displayed on a computing device to provide a visual display of voice commands available to a user.

FIGS. 11 and 11A illustrate an example command controller GUI 1110 displayed on a touch screen 253 (or other display) of computing device 110. The command controller GUI 1110 provides a visual display of simple voice commands available to the user of computing device 110 and, preferably, of active simple voice commands available to the user as they change at different times or stages within the application software 224. The command controller GUI 1110 prompts the user of computing device 110 with the active voice commands differentiated from the inactive (or unavailable) voice commands to facilitate a voice command-driven system so that the user does not have to remember all voice commands available. Non-limiting examples for differentiating active voice commands from inactive (or unavailable) voice commands include (but are not limited to) only displaying the active voice commands on the visual display, or presenting the active voice commands in a different color than the inactive voice commands.

In some embodiments, the command controller GUI 1110 displayed on touch screen 253 of computing device 110 is in the form of a virtual remote control in which the text of active voice commands are displayed (as they change at different times or stages within the application software 224) to inform the user of the voice commands that are available at that time or sequence within application software 224. By way of example only, the command controller GUI 1110 of FIG. 11 may include (but is not limited to) a visual display of the text for the following illustrative simple voice commands available within application software 224: GO, STOP, GO BACK, RESTART, SKIP, REPEAT, SAVE, DELETE, SHARE, HELP, TIME, MUTE, SETTINGS, HEADLINES, STORIES, CHANNELS, REFRESH, PLAY ALL, RESTORE, PREVIOUS and NEXT. However, only certain voice commands (active voice commands) are available to the user of computing device 110 at different stages or times within application software 224. FIG. 11A illustrates, for emphasis, the command controller GUI 1110 with only the text for active voice commands displayed to the user at a given stage or time within application software 224. It is understood, however, that other techniques may be utilized to differentiate active and inactive voice commands on the visual display, such as (but not limited to) displaying active voice commands in a different color from inactive voice commands. In this manner, command controller GUI 1110 provides the user with a visual display that differentiates active voice commands that are available to the user from inactive voice commands that are unavailable to the user at any given time within the application software 224.

In some embodiments, the text of each active voice command displayed by the command controller GUI 1110 on touch screen 253 of computing device 110 may also function as a virtual button to allow the user to provide command inputs by tapping on the text of the desired command. By functioning as a manual interface, the command controller GUI 1110 provides the user of computing device 110 with a simplified interface and an alternative to providing a voice command input or navigating the graphical screen interface. The remote control style presentation of GUI 1110 may also facilitate the use of the system by users who are physically challenged and cannot use a keyboard or other manual input devices to interact with the voice command-driven system. Furthermore, for users who are visually impaired, command controller GUI 1110 may facilitate other systems, such as Apple, Inc.'s VoiceOver™ screen reader, whereby all buttons to control the system are labeled and accessible to visually impaired user's for interaction with the system.

Figure 12:
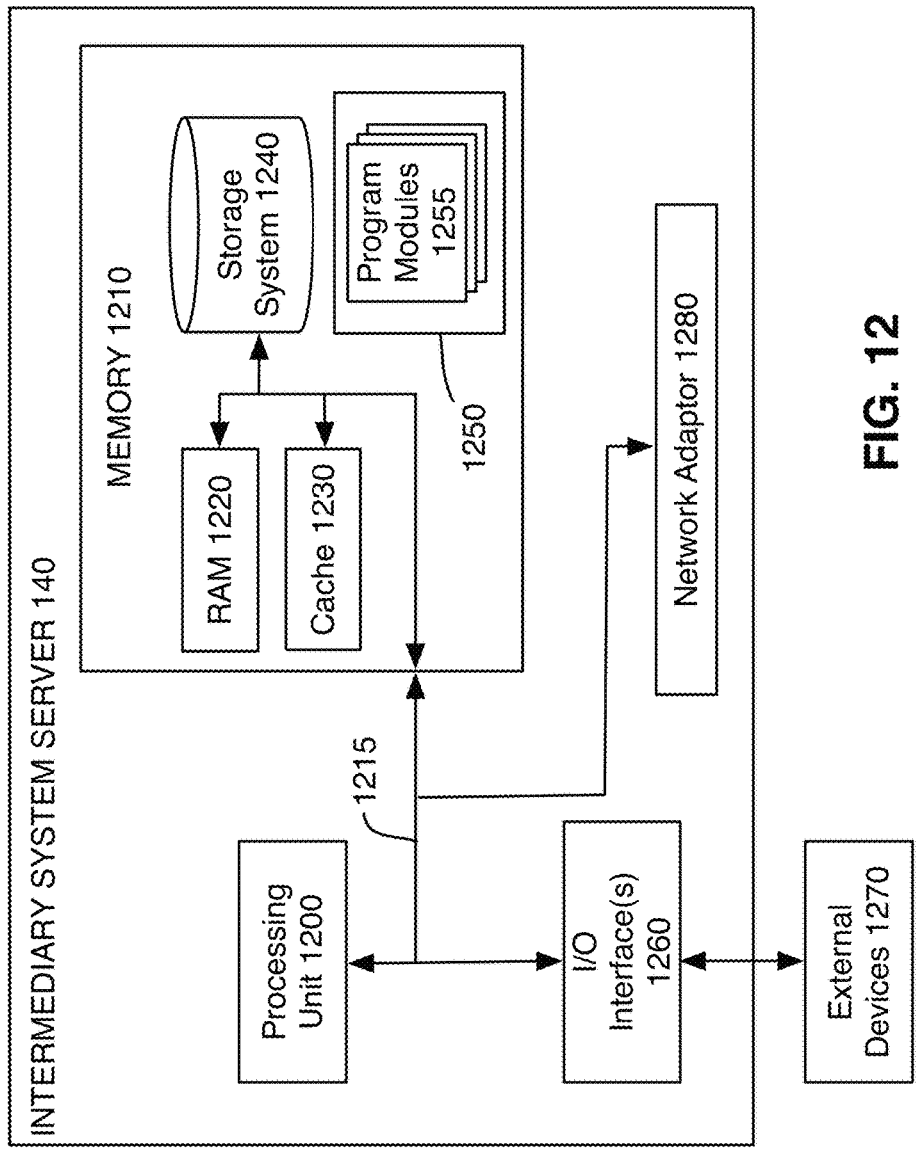
FIG. 12 is a block diagram of an optional system server that may be utilized to implement various features and processes described herein.

FIG. 12 is a high level block diagram of a representative intermediate system server 140 that may be utilized to implement various features and processes described herein. Intermediate system server 140 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 12, optional intermediate system server 140 is illustrated in the form of a special purpose computer system. The components of intermediate system server 140 may include (but are not limited to) one or more processors or processing units 1200, a system memory 1210, and a bus 1215 that couples various system components including memory 1210 to processor 1200.

Bus 1215 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 1200 may execute computer programs stored in memory 1210. Any suitable programming language can be used to implement the routines of particular embodiments including C, C++, Java, Swift, assembly language, etc. Different programming techniques can be employed such as procedural or object oriented. The routines can execute on a single intermediate system server 140 or multiple intermediate system servers 140. Further, multiple processors 1200 may be used.

Intermediate system server 140 typically includes a variety of computer system readable media. Such media may be any available media that is accessible by intermediate system server 140, and it includes both volatile and non-volatile media, removable and non-removable media.

System memory 1210 can include computer system readable media in the form of volatile memory, such as random access memory (RAM) 1220 and/or cache memory 1230. Intermediate system server 140 may further include other removable/non-removable, volatile/non-volatile computer system storage media. By way of example only, storage system 1240 can be provided for reading from and writing to a non-removable, non-volatile magnetic media (not shown and typically referred to as a "hard drive" or "solid state drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1215 by one or more data media interfaces. As will be further depicted and described below, memory 1210 may include at least one program product having a set (e.g., at least one) of program modules that are configured to carry out the functions of embodiments described in this disclosure.

Program/utility 1250, having a set (at least one) of program modules 1255, may be stored in memory 1210 by way of example, and not limitation, as well as an operating system, one or more application software, other program modules, and program data. Each of the operating system, one or more application programs, other program modules, and program data or some combination thereof, may include an implementation of a networking environment.

Intermediate system server 140 may also communicate with one or more external devices 1270 such as a keyboard, a pointing device, a display, etc.; one or more devices that enable a user to interact with intermediate system server 140; and/or any devices (e.g., network card, modem, etc.) that enable intermediate system server 140 to communicate with one or more other computing devices. Such communication can occur via Input/Output (I/O) interface(s) 1260.

In addition, as described above, intermediate system server 140 can communicate with one or more networks 120, such as a local area network (LAN), a general wide area network (WAN) and/or a public network (e.g., the Internet) via network adaptor 1280. As depicted, network adaptor 1280 communicates with other components of intermediate system server 140 via bus 1215. It should be understood that although not shown, other hardware and/or software components could be used in conjunction with intermediate system server 140. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A mobile device news reader, comprising:
at least one processor;
at least one database coupled to the at least one processor;
a text-to-speech engine embedded in the mobile device and executable by the at least one processor to convert text data stored in the at least one database to a speech-based output;
a speech-to-text engine embedded in the mobile device and executable by the at least one processor to process a voice command input received from a user of the device and generate data in the form of text that corresponds to the received voice command input; and
non-transient memory coupled to the at least one processor that stores program instructions, which, when executed by the at least one processor, cause the at least one processor to:
receive text-based news articles and text-based headlines associated with the news articles over a network from a remote server,
store an identification of a single, unique, system-wide, and context-independent voice command input for use to select text-based news articles for output by the speech-to-text engine, to select menu options, and to modify output settings, store a list of the received news articles correlated with a list of the received headlines in the at least one database, and without utilizing a connection to the network,
retrieve the list of headlines from the at least one database,
enter a first list-pause cycle comprising:
a list-pause that comprises:
outputting, via the text-to-speech engine, a headline from the list of received headlines; and
a pause of a predetermined length of time;
repeating the list-pause, each repetition of the list-pause outputting a different next headline from the list of received headlines, until determining that the single, unique, system-wide, and context-independent voice command input has been spoken during the pause of a most recent list-pause; and
responsive to determining that the single, unique, system-wide, and context-independent voice command input has been spoken during the pause of the most recent list-pause, outputting, via the text-to-speech engine, at least a portion of the news article from the sequence of news articles correlated with the headline output during that most recent list-pause;
enter a second list-pause cycle comprising:
a list-pause comprising:
outputting, via the text-to-speech engine, an identifier of a menu option; and
a pause of a predetermined length of time;
repeating the list-pause, each repetition of the list-pause outputting a different next identifier of a menu option, until that the single, unique, system-wide, and context-independent voice command input has been spoken during the pause of a most recent list-pause; and
responsive to determining that the single, unique, system-wide, and context-independent voice command input has been spoken during the pause of the most recent list-pause, navigating to a different menu or mode of the news reader associated with the identifier output during that list-pause; and
enter a third list-pause cycle comprising:
a list-pause comprising:
outputting, via the text-to-speech engine, an identifier of an output setting; and
a pause of a predetermined length of time;
repeating the list-pause, each repetition of the list-pause outputting a different next identifier of an output setting, until determining that the single, unique, system-wide, and context-independent voice command input has been spoken during the pause of a most recent list-pause; and
responsive to determining that the single, unique, system-wide, and context-independent voice command input has been spoken during the pause of the most recent list-pause, modifying an output setting of the text-to-speech engine to match a setting associated with the identifier output during that list-pause.

2. The mobile device news reader of claim 1, wherein the text-based headlines are received from one or more news feeds.

3. The mobile device news reader of claim 1, wherein the program instructions are further configured to cause the at least one processor to:
generate and output a first listen tone when entering a pause of a list-pause.

4. The mobile device news reader of claim 1, further comprising:
a display screen coupled to the at least one processor; and
wherein the program instructions are further configured to cause the at least one processor to provide a visual display of voice commands available to the user on the display screen.

5. The mobile device news reader of claim 4, wherein the visual display identifies active voice commands available to the user at a current stage within the program instructions.

6. The mobile device news reader of claim 5, wherein the visual display includes text of each active voice command available to the user.

7. The mobile device news reader of claim 6, wherein the display screen is a pressure-sensitive touch screen and each active voice command identified in the visual display is a virtual button configured to generate a signal indicating a selection of one of the active voice commands identified on the touch screen when the user applies pressure on the touch screen in the vicinity of the button associated with the one of the active voice commands.

8. A voice-command driven method for controlling a news reader device, comprising:
receiving, using at least one processor, text-based news articles and text-based headlines associated with the news articles over a network from a remote server;
storing, using the at least one processor, an identification of a single, unique, system-wide, and context-independent voice command input for use to select text-based news articles for output by the speech-to-text engine, to select menu options, and to modify output settings,
storing, using the at least one processor, a list of the received news articles correlated with a list of the received headlines in at least one database coupled to the at least one processor in the device, and
without utilizing a connection to the network,
retrieving, using the at least one processor, the list of headlines from the at least one database,
entering a first list-pause cycle comprising:
a list-pause that comprises:
outputting, via the text-to-speech engine, a headline from the list of received headlines; and
a pause of a predetermined length of time;
repeating the list-pause, each repetition of the list-pause outputting a different next headline from the list of received headlines, until determining that the single, unique, system-wide, and context-independent voice command input has been spoken during the pause of a most recent list-pause; and
responsive to determining that the single, unique, system-wide, and context-independent voice command input has been spoken during the pause of the most recent list-pause, outputting, via the text-to-speech engine, at least a portion of the news article from the sequence of news articles correlated with the headline output during that most recent list-pause;

entering a second list-pause cycle comprising:
 a list-pause comprising:
  outputting, via the text-to-speech engine, an identifier of a menu option; and
  a pause of a predetermined length of time;
 repeating the list-pause, each repetition of the list-pause outputting a different next identifier of a menu option, until that the single, unique, system-wide, and context-independent voice command input has been spoken during the pause of a most recent list-pause; and
 responsive to determining that the single, unique, system-wide, and context-independent voice command input has been spoken during the pause of the most recent list-pause, navigating to a different menu or mode of the news reader associated with the identifier output during that list-pause; and
enter a third list-pause cycle comprising:
 a list-pause comprising:
  outputting, via the text-to-speech engine, an identifier of an output setting; and
  a pause of a predetermined length of time;
 repeating the list-pause, each repetition of the list-pause outputting a different next identifier of an output setting, until determining that the single, unique, system-wide, and context-independent voice command input has been spoken during the pause of a most recent list-pause; and
 responsive to determining that the single, unique, system-wide, and context-independent voice command input has been spoken during the pause of the most recent list-pause, modifying an output setting of the text-to-speech engine to match a setting associated with the identifier output during that list-pause.

9. The voice-command driven method of claim 8, wherein the text-based headlines are received from one or more news feeds.

10. The voice-command driven method of claim 8, further comprising:
 generating and outputting a first listen tone, using the at least one processor, when entering into a pause of a list-pause cycle.

11. The voice-command driven method of claim 8, further comprising:
 providing a visual display of voice commands available to the user on a display screen coupled to the at least one processor.

12. The voice-command driven method of claim 11, wherein the visual display identifies active voice commands available to the user at a current operating state of the device.

13. The voice-command driven method of claim 12, wherein the visual display includes text of each active voice command available to the user.

14. The voice-command driven method of claim 13, wherein the display screen is a pressure-sensitive touch screen and each active voice command identified in the visual display is a virtual button configured to generate a signal indicating a selection of one of the active voice commands identified on the touch screen when the user applies pressure on the touch screen in the vicinity of the button associated with the one of the active voice commands.

* * * * *